United States Patent
Suzuki

(10) Patent No.: US 7,911,299 B2
(45) Date of Patent: Mar. 22, 2011

(54) MICROACTUATOR, OPTICAL APPARATUS, AND OPTICAL SWITCH

(75) Inventor: Junji Suzuki, Hachioji (JP)

(73) Assignee: Nikon Corporation, Tokyo (JP)

( * ) Notice: Subject to any disclaimer, the term of this patent is extended or adjusted under 35 U.S.C. 154(b) by 270 days.

(21) Appl. No.: 11/994,835

(22) PCT Filed: Jun. 30, 2006

(86) PCT No.: PCT/JP2006/313524
§ 371 (c)(1),
(2), (4) Date: Jan. 5, 2008

(87) PCT Pub. No.: WO2007/004710
PCT Pub. Date: Jan. 11, 2007

(65) Prior Publication Data
US 2009/0122380 A1 May 14, 2009

(30) Foreign Application Priority Data
Jul. 6, 2005 (JP) .................................. 2005-197092

(51) Int. Cl.
*H01H 51/22* (2006.01)
(52) U.S. Cl. .............................. 335/78; 200/181; 385/15
(58) Field of Classification Search .................... 335/78; 200/181; 385/15
See application file for complete search history.

(56) References Cited

U.S. PATENT DOCUMENTS

| 5,959,760 A | 9/1999 | Yamada et al. |
| 6,198,656 B1 * | 3/2001 | Zhang ........................... 365/154 |
| 6,490,073 B2 * | 12/2002 | Yoon ........................... 359/224.1 |
| 6,758,983 B2 * | 7/2004 | Conant et al. ...................... 216/2 |
| 7,016,100 B2 * | 3/2006 | Kurosawa ..................... 359/295 |
| 2005/0213878 A1 | 9/2005 | Akagawa et al. |

FOREIGN PATENT DOCUMENTS

| JP | 11-52278 A | 2/1999 |
| JP | 2001-042233 A | 2/2001 |
| JP | 2004-130466 A | 4/2004 |
| WO | WO 03/060592 A1 | 7/2003 |

* cited by examiner

*Primary Examiner* — Anh T Mai
*Assistant Examiner* — Bernard Rojas
(74) *Attorney, Agent, or Firm* — Miles & Stockbridge P.C.

(57) ABSTRACT

A microactuator has a fixed portion and a movable portion that is provided in such a way as to be movable relative to the fixed portion between a first position at which it is in contact with a predetermined portion of the fixed portion and a second position away from the first position. The fixed portion has a first electrode portion, the movable portion has a second electrode portion that can produce an electrostatic force between it and the first electrode portion by a voltage between it and the first electrode portion, and the first and second electrode portions are arranged in such a way that a first force that biases the movable portion in a direction toward the first position according to the electrostatic force created when the voltage is constant reaches a peak when the movable portion is at a third position between the first position and the second position.

30 Claims, 18 Drawing Sheets

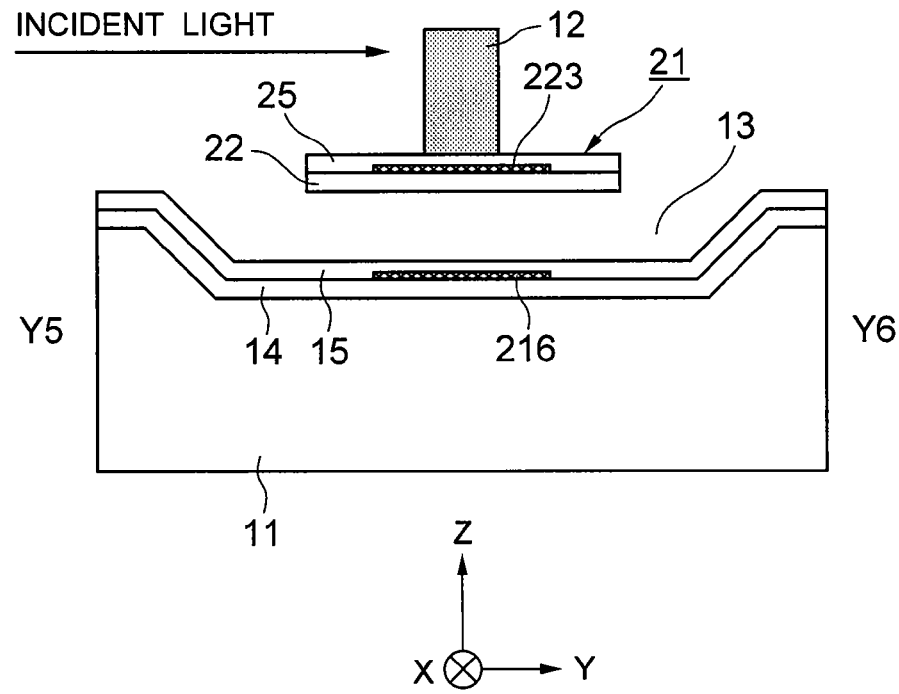
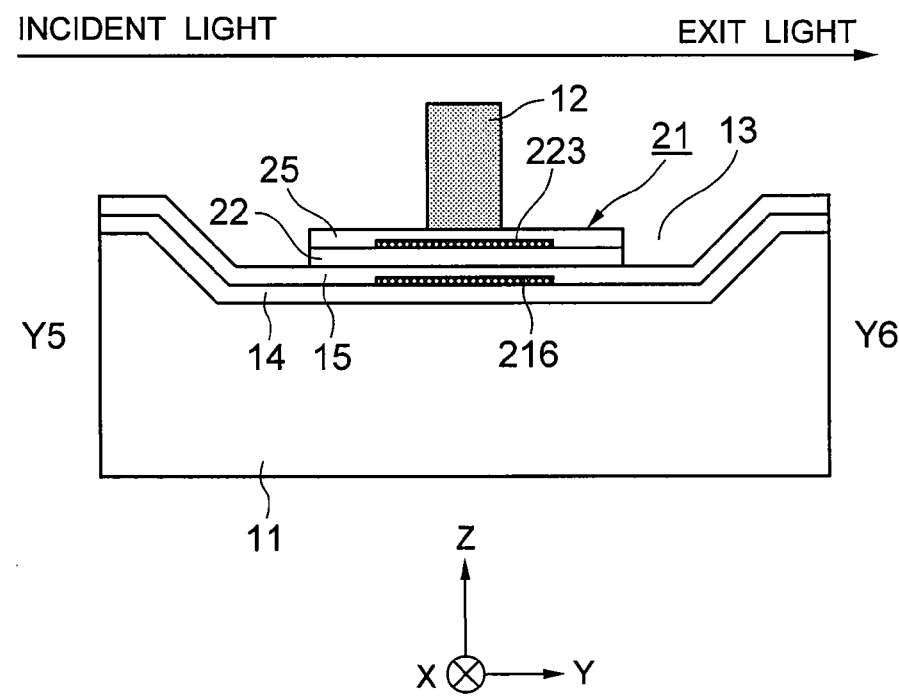

MICROACTUATOR, OPTICAL APPARATUS, AND OPTICAL SWITCH

TECHNICAL FIELD

The present invention relates to a microactuator, and an optical apparatus and optical switch using the same.

BACKGROUND ART

With development of micromachining technologies, the importance of actuators has been increasing in various fields. An example of the field in which microactuators are used is, for example, an optical switch that is used in optical communication or the like to switch the optical path. Examples of such an optical switch include, for example, optical switches disclosed in Japanese Patent Application Laid-Open No. 2001-42233 and the pamphlet of International Publication WO03/060592.

A microactuator generally has a fixed portion and a movable portion that is adapted to be movable relative to the fixed portion, and the movable portion can be moved and retained at a predetermined position by a driving force applied thereto.

In a microactuator that utilizes as the driving force an electrostatic force, a fixed electrode and a movable electrode are provided in the fixed portion and the movable portion respectively. In such a microactuator, since an electrostatic force is generated between the electrodes by applying a voltage between the electrodes, advantages such as simplification of the structure can be achieved. For this reason, in many conventional microactuators, an electrostatic force is utilized as the driving force.

In a microactuator for moving a micro mirror used in an optical switch disclosed in Japanese Patent Application Laid-Open No. 2001-42233, an electrostatic force is used to move a movable portion to a predetermined position against a spring force acting on the movable portion and to retain it at that position. A microactuator used in an optical switch disclosed in the pamphlet of International Publication WO03/060592 is adapted to be capable of utilizing, as a driving force, a Lorentz force in addition to an electrostatic force. For example, a movable portion is moved to a predetermined position by a Lorentz force against a spring force acting on the movable portion, and the movable portion is retained at that position by an electrostatic force.

In conventional microactuators that utilize an electrostatic force including the microactuators disclosed in Japanese Patent Application Laid-Open No. 2001-42233 and the pamphlet of the International Publication WO03/060592, the fixed electrode and the movable electrode are arranged in such a way that they overlap each other for the most part as seen from the direction of movement of the movable portion.

In conventional microactuators utilizing an electrostatic force, since the fixed electrode and the movable electrode are arranged in such a way that they overlap each other for the most part as seen from the direction of movement of the movable portion, when an electrostatic force is generated, the state in which the movable portion is in contact with the fixed portion (which state will be referred to as "pull-in state" in this specification) occurs, and it has not been possible to retain the movable portion stably at a position before it comes in contact with the fixed portion in the state in which an electrostatic force is generated.

In conventional microactuators utilizing an electrostatic force, troubles have occurred, or their uses have been limited due to occurrence of the above mentioned pull-in state.

For example, since the movable portion is pressed against the fixed portion in the above mentioned pull-in state, the movable portion may stick to the fixed portion to become inoperable, or even if it does not become inoperable, operation delay may occur due to time taken in detaching the movable portion from the fixed portion.

Furthermore, for example, due to occurrence of the above mentioned pull-in state, it is not possible to control the position of the movable portion in such an analogue manner as to change the stop position of the movable portion to a desired position according to the magnitude of the voltage applied between the fixed electrode and the movable electrode, conventional microactuators that utilize an electrostatic force have had only limited applications such as optical switches which can be satisfactorily position-controlled in a digital manner.

DISCLOSURE OF THE INVENTION

The present invention has been made in view of the above described situations, and has as an object to provide a microactuator that can prevent the pull-in state from occurring while still utilizing an electrostatic force and to provide an optical switch and optical apparatus using the same.

To solve the above described problem, a micro actuator according to a first aspect of the present invention comprises a fixed portion and a movable portion that is provided in such a way as to be movable relative to said fixed portion between a first position at which it is in contact with a predetermined portion of said fixed portion and a second position away from said first position, wherein said fixed portion has a first electrode portion, said movable portion has a second electrode portion that can produce an electrostatic force between it and said first electrode portion by a voltage between it and said first electrode portion, and said first and second electrode portions are arranged in such a way that a first force that biases said movable portion in a direction toward said first position according to said electrostatic force created when said voltage is constant reaches a peak when said movable portion is at a third position between said first position and said second position.

According to a second aspect of the present invention, in the microactuator according to said first aspect, said first and second electrode portions are arranged in such a way that said first and second electrode portions substantially do not overlap each other when seen in the direction of movement of said movable portion between said first and second positions.

A microactuator according to a third aspect of the present invention comprises a fixed portion and a movable portion that is provided in such a way as to be movable relative to said fixed portion between a first position at which it is in contact with a predetermined portion of said fixed portion and a second position away from said first position, wherein said fixed portion has a first electrode portion, said movable portion has a second electrode portion that can produce an electrostatic force between it and said first electrode portion by a voltage between it and said first electrode portion, and said first and second electrode portions are arranged in such a way that said first and second electrode portions substantially do not overlap each other when seen in the direction of movement of said movable portion between said first and second positions.

According to a fourth aspect of the present invention, in the microactuator according to any one of said first to third aspects, each of said first and second electrode portions has a substantially plane symmetric shape with respect to at least one same plane containing the direction of movement of said movable portion between said first and second positions.

According to a fifth aspect of the present invention, in the microactuator according to any one of said first to fourth aspects, the microactuator is designed in such a way that a second force that biases said movable portion in a direction from said first position toward said second position can be generated.

According to a sixth aspect of the present invention, in the microactuator according to said fifth aspect, said movable portion is provided in such a way that a spring force that tends to return to said second position is regenerated as said second force.

According to a seventh aspect of the present invention, in the microactuator according to said fifth or sixth aspect, the microactuator is provided with generation means that generates a third force different from said first and second forces in said movable portion.

According to an eighth aspect of the present invention, in the microactuator according to said seventh aspect, said generation means comprises a current path that is provided in said movable portion and disposed in a magnetic field and generates a Lorentz force when supplied with a current.

An optical apparatus according to a ninth aspect of the present invention comprises the microactuator according to any one of said first to eighth aspects and a driven member mounted on said movable portion, wherein said driven member comprises an optical element.

An optical switch according to a tenth aspect of the present invention comprises the microactuator according to any one of said first to eighth aspects and a driven member mounted on said movable portion, wherein said driven member comprises an optical element.

In the first to tenth aspects, said movable portion may be composed of a thin film.

According to the present invention, there can be provided a microactuator in which occurrence of the pull-in state can be prevented even still using an electrostatic force, and an optical switch and an optical apparatus using the same.

BRIEF DESCRIPTION OF DRAWINGS

FIG. 7 is a schematic cross sectional view taken along line Y5-Y6 in FIG. 6, FIG. 7 showing a state in which a mirror is retained at an upper position.

FIG. 8 is a schematic cross sectional view taken along line Y5-Y6 in FIG. 6, FIG. 8 showing a state in which a mirror is retained at a lower position.

THE MOST PREFERRED EMBODIMENTS FOR CARRYING OUT THE INVENTION

In the following, the microactuator, the optical apparatus and the optical switch according to the present invention will be described with reference to the drawings.

First Embodiment

Figure 1:
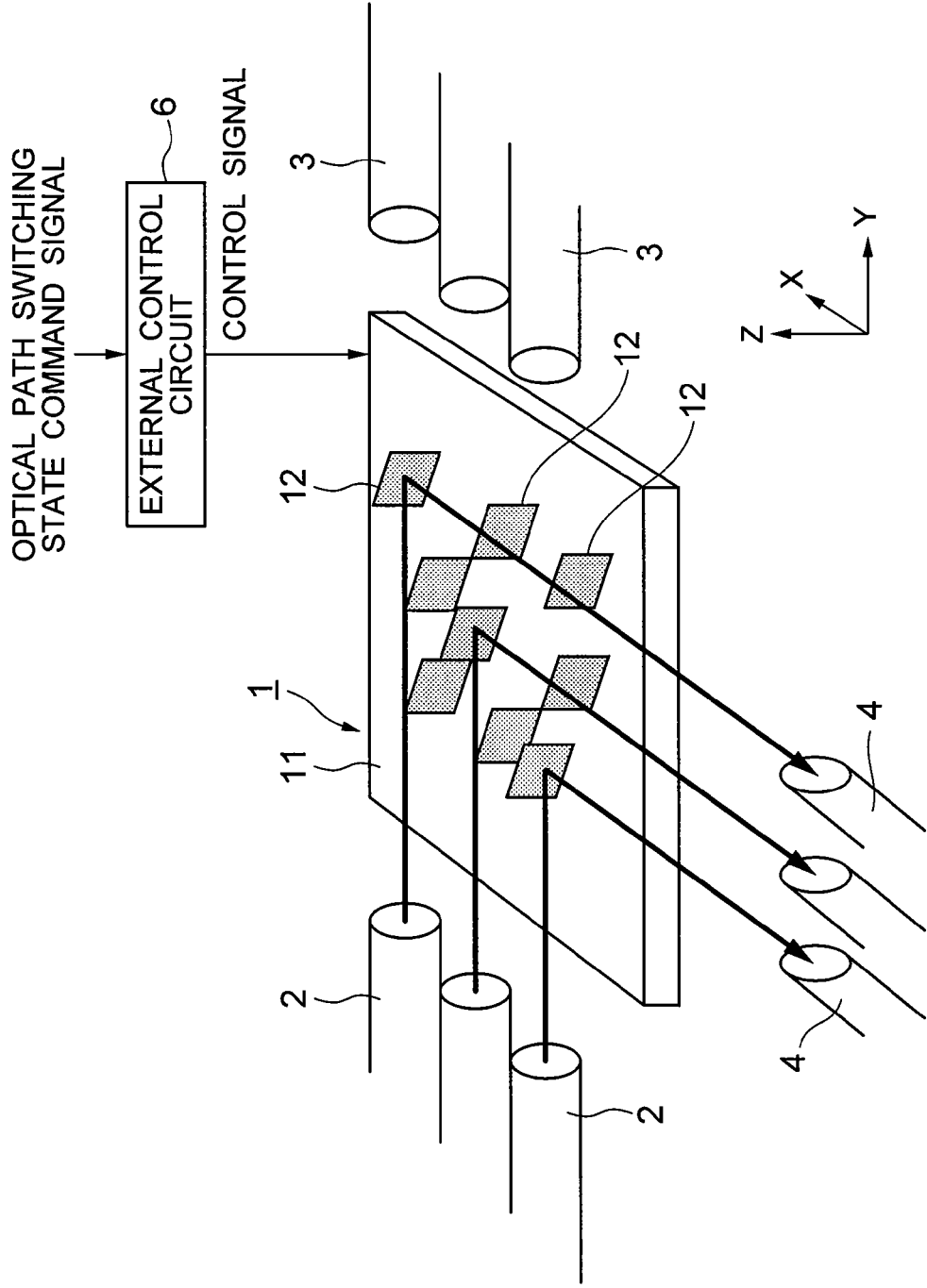
FIG. 1 is a general diagram schematically showing an example of an optical system provided with an optical switch array according to a first embodiment of the present invention.

FIG. 1 is a general diagram schematically showing an example of an optical system (that is, in this embodiment, an optical switch system) provided with an optical switch array 1 that constitutes an optical switch apparatus as an optical apparatus according to the first embodiment of the present invention. As shown in FIG. 1, the X axis, Y axis and Z axis that are perpendicular to each other are defined for the convenience of explanation. (This also applies to drawings that will be referred to later.) The surface of a substrate 11 of the optical switch array 1 is parallel to the X−Y plane. The direction along the Z axis indicated by the arrow will be referred to as the +Z direction or the +z side, and the direction opposite thereto will be referred to as the −Z direction or the −Z side. This also applies to the X axis direction and the Y axis direction. In connection with this, the plus side of the Z axis direction will sometimes be referred to as the upper side, and the minus side of the Z axis direction will sometimes be referred to as the lower side.

As shown in FIG. 1, this optical switch system has the optical switch array 1, m light input optical fibers 2, m light output optical fibers 3, n light output optical fibers 4, an external control circuit 6 as an control portion that supplies, in response to an optical path switching state command signal, a control signal for achieving the optical path switching state prescribed by the optical path switching state command signal to an optical switch array 1. In the case shown in FIG. 1, m=3 and n=3, but m and n may be arbitrary numbers respectively.

The optical switch array 1 includes the substrate 11 and m×n mirrors 12 arranged on the substrate 11. The m light input optical fibers 2 are arranged in a plane parallel to the XY plane so as to guide incident light from one side of the Y axis direction relative to the substrate 11 in the Y axis direction. The m light output optical fibers 3 are disposed on the other side relative to the substrate 11 so as to be opposed to the m light input optical fibers 2 respectively and arranged in a plane parallel to the XY plane so that light that travels in the Y axis direction without being reflected by any mirror 12 in the optical switch array 1 is incident thereon. The n light output optical fibers 4 are arranged in a plane parallel to the XY plane so that light that is reflected by any mirror 12 in the optical switch array 1 and travels in the X axis direction is incident thereon. The m×n mirrors 12 are arranged on the substrate 11 in a two dimensional matrix pattern in such a way that they can be moved along the Z axis direction so as to be moved to and removed from the intersection points of the exit optical paths from the m light input optical fibers 2 and the incident optical paths to the m light output optical fibers 4 respectively by microactuators that will be described later. In this embodiment, the orientation of the mirrors 12 is arranged in such a way that the normal line thereof and the X axis form an angle of 45 degrees in a plane parallel to the XY plane. The operation principle of optical path switching in this optical switch system per se is the same as the operation principle of optical path switching in conventional two-dimensional optical switches.

Figure 2:
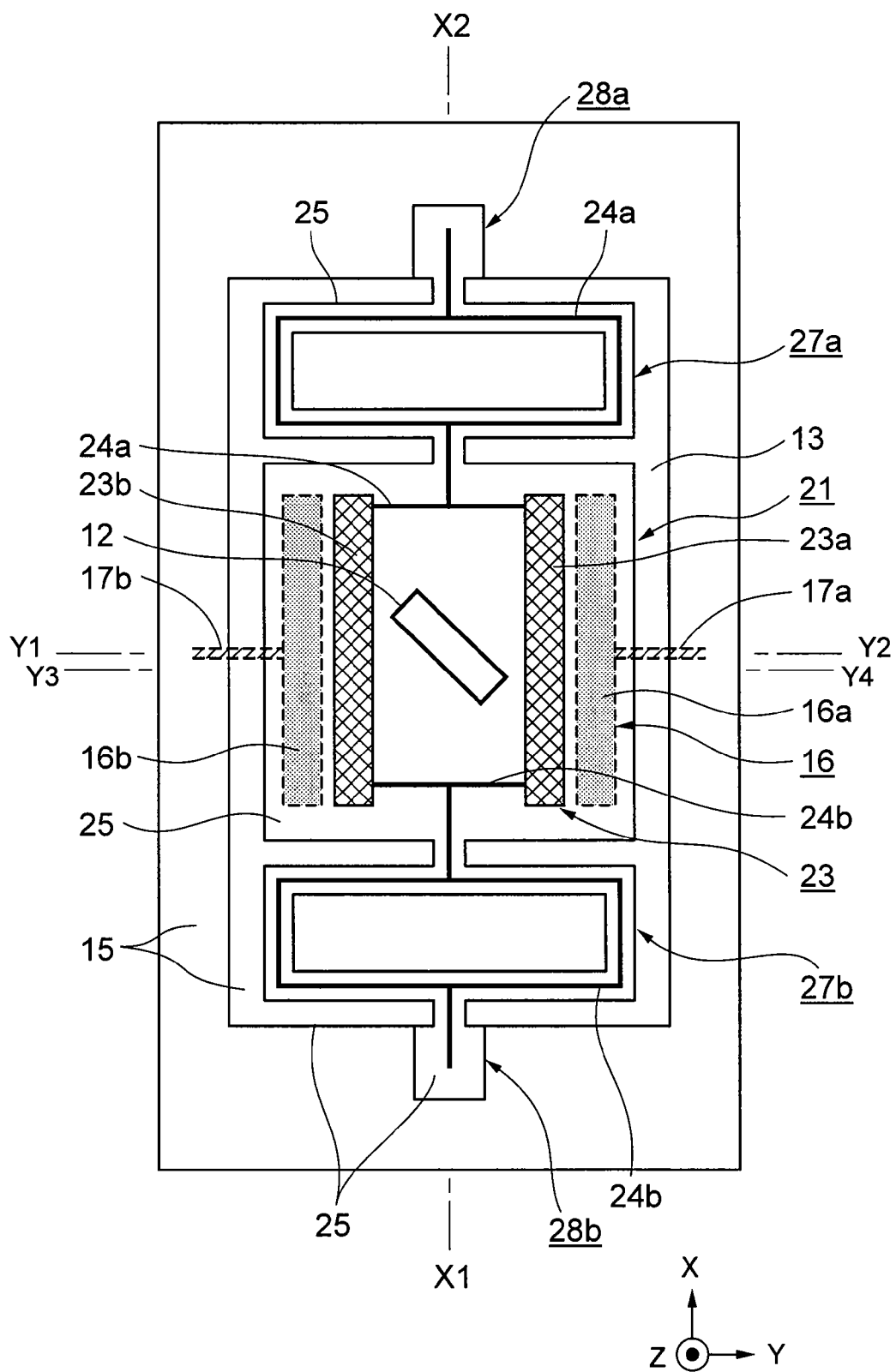
FIG. 2 is a schematic plan view schematically showing one optical switch as a unit element of the optical switch array shown in FIG. 1.
Figure 3:
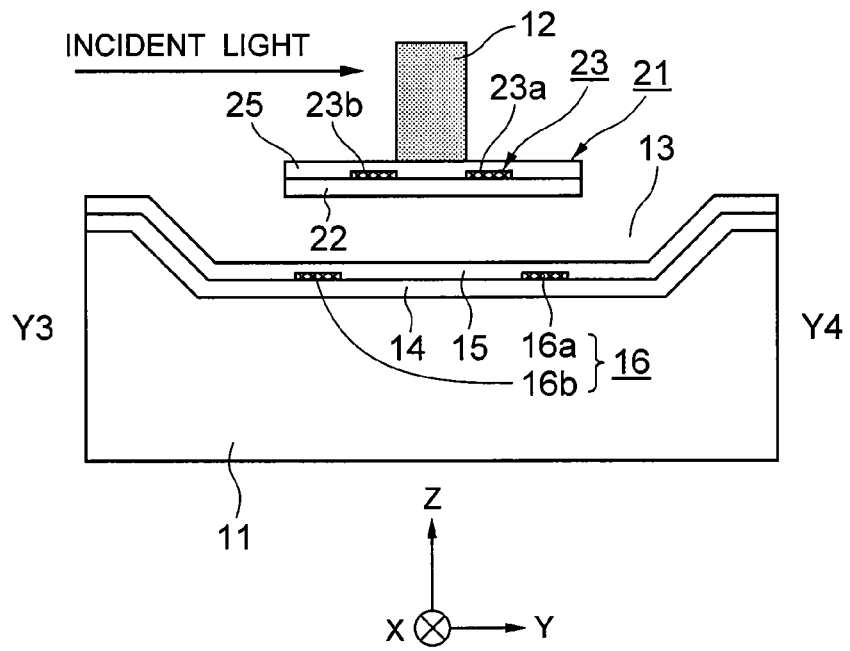
FIG. 3 is a schematic cross sectional view taken along line Y3-Y4 in FIG. 2, FIG. 3 showing a state in which a mirror is retained at an upper position.
Figure 4:
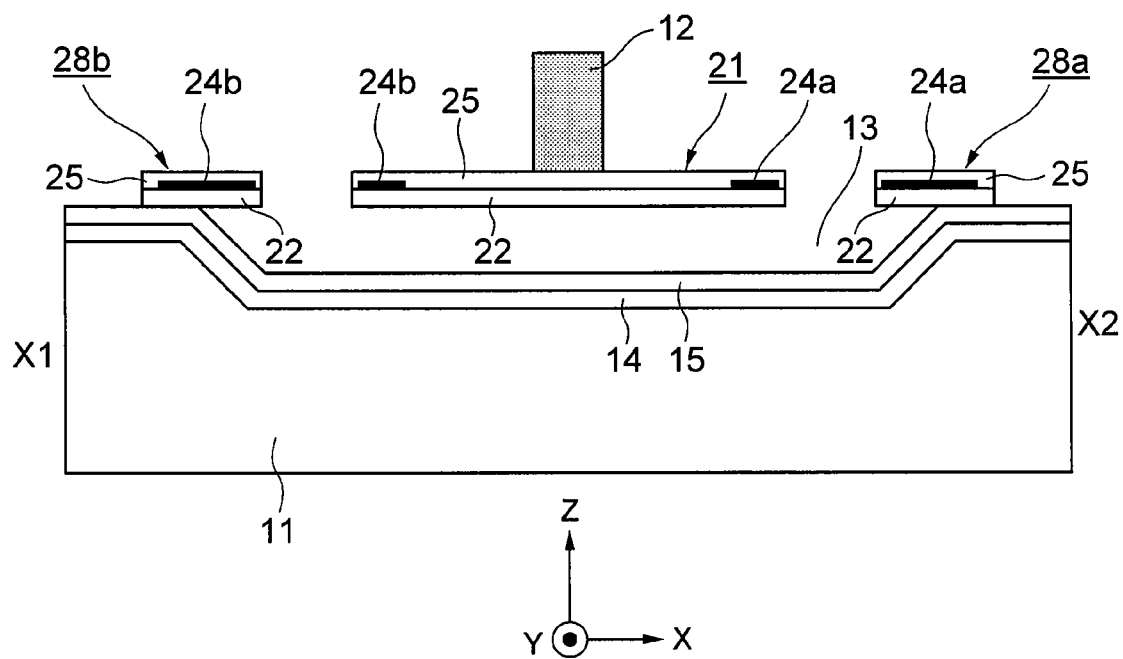
FIG. 4 is a schematic cross sectional view taken along line X1-X2 in FIG. 2.
Figure 5:
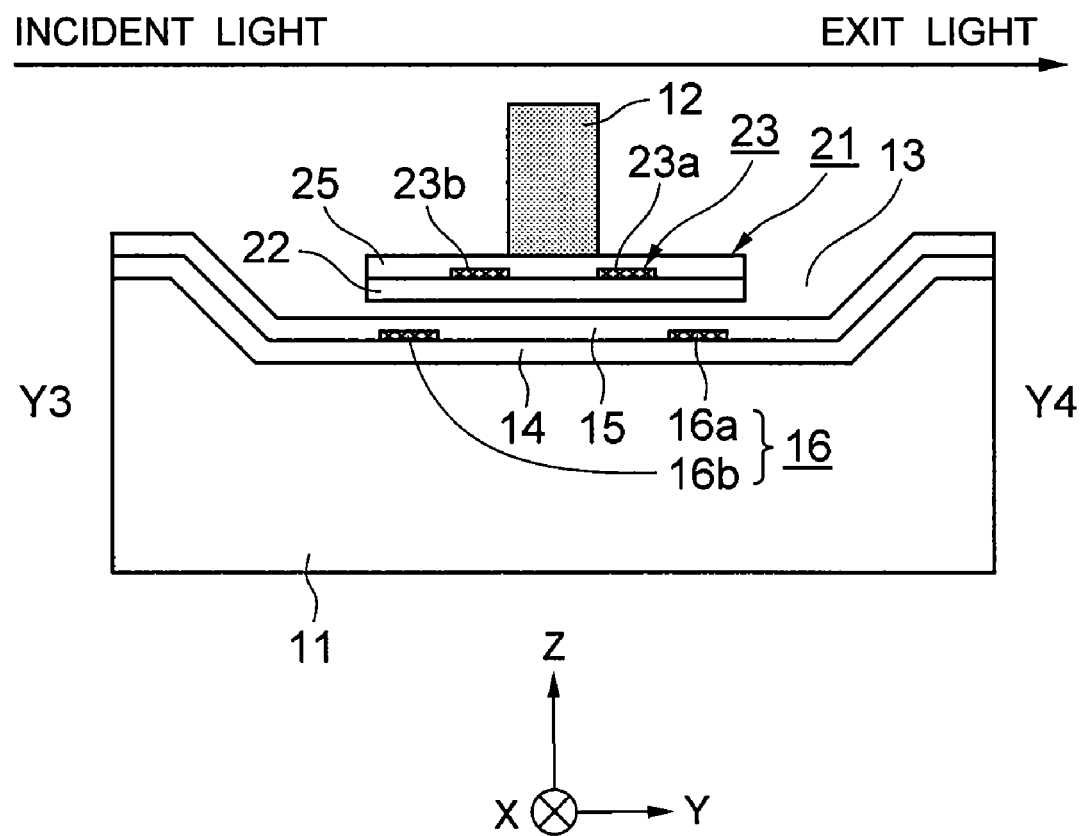
FIG. 5 is a schematic cross sectional view taken along line Y3-Y4 in FIG. 2, FIG. 5 showing a state in which the mirror is retained at a lower position.

Next, the configuration of one optical switch used as a unit element of the optical switch array 1 shown in FIG. 1 will be described with reference to FIGS. 2 to 5. FIG. 2 is a schematic plan view of the optical switch. FIG. 3 is a schematic cross sectional view taken along line Y3-Y4 in FIG. 2. FIG. 4 is a schematic cross sectional view taken along line X1-X2 in FIG. 2. FIG. 5 is a cross sectional view equivalent to FIG. 3, but shows a state in which the mirror 12 is retained at a lower position. In This connection, FIGS. 3 and 4 show a state in which the mirror 12 is retained at an upper position.

This optical switch has, besides the above described mirror 12 and the above described substrate 11, a movable plate 21 serving as the movable portion that is provided in such a way as to be movable relative to the substrate 11. The substrate 11 is provided with a recessed portion 13 that constitutes a region which the movable plate 21 enters. In this embodiment, the substrate 11 used is a semiconductor substrate such as a silicon substrate. Insulating films 14, 15 such as silicon oxide films are layered on the substrate 11. Two electrodes 16a, 16b that constitute a fixed electrode portion 16 serving as the first electrode portion and wiring patterns 17a, 17b therefor are formed between the insulating films 14, 15. To the electrodes 16a, 16b are applied an identical electric potential through the wiring patterns 17a, 17b. The electrodes 16a, 16b and wiring patterns 17a, 17b may be made of, for example, a metal film such as an Al film. In this embodiment, the fixed portion includes the substrate 11, the insulating films 14, 15, the fixed electrode portion 16 and the wiring patterns 17a, 17b.

The movable plate 21 is made of thin films and has a lower insulating film 22, two electrodes 23a, 23b that constitute a movable electrode portion 23 serving as the second electrode portion formed on the lower insulating film 22 and portions of wiring patterns 24a, 24b for the electrodes 23a, 23b formed on the lower insulating film 22 and an upper insulating film 25 covering the upper surface of them. An electrostatic force can be created between the movable electrode portion 23 and the fixed electrode portion 16 by a voltage between the movable electrode portion 23 and the fixed electrode portion 16. For example, the insulating films 22,25 may be made of silicon oxide films or the like, and the electrodes 23a, 23b and the wiring patterns 24a, 24b may be made of metal films such as Al films.

Although the electrodes 23a, 23b and the wiring patterns 24a, 24b are covered with the upper insulating film 25 and should normally be drawn as hidden lines in FIG. 2 accordingly, the portions hidden by the upper insulating film 25 are also drawn in solid lines for the convenience of graphical illustration. The electrodes 16a, 16b and the wiring patterns 17a, 17b are drawn as hidden lines.

In this embodiment, both end portions of the movable plate 21 with respect to the X axis direction are mechanically connected to the peripheral portion of the recessed portion 13 of the substrate 11 via flexure portions 27a, 27b as spring portions having a spring characteristic and anchor portions 28a, 28b in the mentioned order. The flexure portions 27a, 27b and the anchor portions 28a, 28b are constituted by the lower insulating film 22, the remainder of the aforementioned wiring patterns 24a, 24b and the upper insulating film 25 that extend continuously from the movable plate 21 without change. Although not shown in the drawings, the wiring patterns 24a, 24b are electrically connected to wiring patterns (not shown) formed between the insulating films 14, 15 via holes (not shown) formed on the insulating films 22, 15 at the anchor portions 28a, 28b and electrically connected commonly through them, and a desired electric potential can be applied to the wiring patterns 24a, 24b.

The flexure portions 27a, 27b have quadrilateral shapes in the plan view as shown in FIG. 2. Thus, the movable plate 21 is adapted to be movable in the up and down directions (i.e. along the Z axis). Specifically, in this embodiment, the movable plate 21 is adapted to be movable between an upper position (or the second position) (see FIGS. 3 and 4) to which it tends to be returned by a spring force (restoring force) of the flexure portions 27a, 27b and a lower bound position (or the first position) (not shown) at which the movable plate 21 having entered the recessed portion 13 of the substrate 11 comes in contact with the bottom of the recessed portion 13 (or, strictly speaking, with the insulating film 15 on the recessed portion 13 of the substrate 11). In this embodiment, however, the movable plate 21 does not come in contact with the bottom of the recessed portion 13, but when the movable plate 21 is retained on the lower side, it is retained at a lower position shown in FIG. 5 between the aforementioned upper position and the aforementioned lower bound position as will be described later.

The movable plate 21 and the flexure portions 27a, 27b are plane symmetric in shape and structure with respect to the plane that contains line X1-X2 and is parallel to the X-Z plane and with respect to the plane that contains line Y1-Y2 and is parallel to the Y-Z plane respectively.

The fixed electrode portion 16 and the movable electrode portion 23 are arranged in such a way that a first force that biases the movable plate 21 downwardly (or in the −Z direction) according to the electrostatic force acting between the electrode portions 16 and 23 that is generated when the voltage between the electrode portions 16 and 23 is constant reaches a peak when the movable plate 21 is at a third position between the lower bound position (or the first position) at which the movable plate 21 is in contact with the bottom of the recessed portion 13 and the upper position (or the second position) shown in FIGS. 3 and 4.

In this embodiment, such an arrangement is realized by arranging the two electrodes 16a, 16b that constitute the fixed electrode portion 16 and the two electrodes 23a, 23b that constitute the movable electrode portion 23 in such a way that they do not overlap in the plan view as seen in the direction of the Z axis (or the direction of movement of the movable plate 21) as shown in FIG. 2.

In this embodiment, each of the electrodes 16a, 16b, 23a and 23b has a rectangular strip-like shape extending in the direction of X axis. The electrodes 16a, 16b that constitutes the fixed electrode portion 16 are arranged in a manner shown in FIG. 2, whereby the fixed electrode portion 16 has a shape that is plane symmetric with respect to the plane that contains line X1-X2 and is parallel to the X-Z plane and with respect to the plane that contains line Y1-Y2 and is parallel to the Y-Z plane. Similarly, the electrodes 23a, 23b that constitutes the movable electrode portion 23 are arranged in a manner shown in FIG. 2, whereby the movable electrode portion 23 has a shape that is plane symmetric with respect to the plane that contains line X1-X2 and is parallel to the X-Z plane and with respect to the plane that contains line Y1-Y2 and is parallel to the Y-Z plane. The electrodes 23a and 23b are arranged on the +Y side and the −Y side respectively with respect to the plane that contains line X1-X2 and is parallel to the X-Z plane. In the plan view as seen in the Z axis direction, the electrode 16a is arranged on the +Y side of the electrode 23a side by side with a small spacing from the electrode 23a, and both the electrodes do not overlap. In the plan view as seen in the Z axis direction, the electrode 16b is arranged on the −Y side of the electrode 23b side by side with a small spacing from the electrode 23b, and both the electrodes do not overlap.

The mirror 12 is fixed perpendicularly on the upper surface of the movable plate 21. As described before, the orientation of the reflecting surface of the mirrors 12 is arranged in such a way that the normal line thereof and the X axis form an angle of 45 degrees in a plane parallel to the XY plane.

In this embodiment, by controlling the voltage between the fixed electrode portion 16 and the movable electrode portion 23, the state in which the mirror 12 is retained at the upper position (away from the substrate 11) (shown in FIGS. 3 and 4) and the state in which the mirror 12 is retained at the lower position (close to the substrate 11) (shown in FIG. 5) can be achieved as will be described in detail later. In this embodiment, this control is performed by the external control circuit 6 shown in FIG. 1.

In the state where the mirror 12 is retained at the upper position, incident light traveling in the Y axis direction is reflected by the mirror 12 as shown in FIG. 3 to travel in the direction toward the front side of the drawing sheet of FIG. 3. In the state where the mirror 12 is retained at the lower position, incident light traveling in the Y axis direction is not reflected by the mirror 12 but passes through it without change to become exit light.

A microactuator that drives the mirror 12 is constituted by the components of the above described optical switch structure other than the mirror 12.

The optical switch array 1 according to this embodiment can be manufactured using semiconductor manufacturing techniques such as forming and patterning of a film, etching, and forming and removal of a sacrificial layer, for example. The outline of an example of this manufacturing method will be briefly described. First, the recessed portions 13 are formed on the silicon substrate 1 by photolithographic etching. Then, the insulating film 14, electrodes 16a, 16b, wiring patterns 17a, 17b and insulating film 15 etc. are formed by film deposition and patterning. Then, a first resist as a sacrificial layer is formed to fill the recessed portions 13, and flattening by CMP (Chemical Mechanical Polishing) or the like is performed to leave the aforementioned first resist only in the recessed portions 13. Thereafter, the insulating film 22, electrodes 23a, 23b, wiring patters 24a, 24b and insulating film 25 etc. are formed by film deposition and patterning. Subsequently, recesses allocated for the mirrors 12 are formed by a second resist, and thereafter metal portions such as Au, Ai or the like that are to constitute mirrors 12 are grown by electrolytic plating as described in Japanese Patent the above mentioned Application Laid-Open No. 2001-42233. Finally, the aforementioned first and second resists are removed, whereby the optical switch array 1 is finished. In this embodiment, since the wiring patterns 17a, 17b are formed in such a way as to climb over the stepped wall portions of the recessed portions 13, it may be difficult to form the wiring patterns 17a, 17b in manufacturing in some cases. In such cases, for example, the area other than the recessed portions 13 on the silicon substrate 1 may be restricted to the areas near the flexure portions 27a, 27b to enlarge the area of the recessed portions 13 in the silicon substrate 1, and the wiring patterns 17a, 17b may be formed only within the area of the recessed portions 13a.

In the following, the operation principle of the microactuator of one optical switch in the optical switch array 1 according to this embodiment will be described.

As shown in FIGS. 3 and 4, when a voltage is applied between the fixed electrode 16 and the movable electrode 23 in the state in which the movable plate 21 is retained at the upper position, an electrostatic force acts between these electrodes 16 and 23 (in particular, between electrodes 16a and 23a and between electrodes 16b and 23b, in this embodiment). Since in the plan view as seen in the Z axis direction, the electrode 16a and the electrode 23a do not overlap, and electrode 16b and the electrode 23b do not overlap, the direction of electrostatic force acting between the electrodes 16a and 23a and the direction of the electrostatic force acting between the electrodes 16b and 23b are inclined with respect to the Z axis. However, thanks to the above described symmetry of the electrode portions 16 and 23, the components of the electrostatic forces in the X axis direction and the Y axis direction are cancelled, and only the component of the generated electrostatic forces in the Z axis direction acts effectively on the movable plate 21. Thus, a force that biases the movable plate 21 in the downward direction (−Z direction) is exerted on it by the electrostatic force generated between the electrode portions 16 and 23. This causes the movable plate 21 to move in the downward direction.

When the movable plate 21 is displaced in the downward direction, the spring force of the flexure portions 27a, 27b acts as a restoring force in the upward direction (+Z direction) according to the displacement amount. At first, the magnitude of the downward biasing force by the aforementioned electrostatic force is larger than the magnitude of this spring force, and the movable plate 21 moves downward.

On the other hand, as the movable plate 21 moves downward and comes closer to the substrate 11, the downward biasing force by the electrostatic force acting between the electrode portions 16 and 23 increases at first since the distance between the electrodes 16a, 23a and the electrodes 16b and 23b becomes shorter. However, as the movable plate 21 moves downward, the proportion of the Z direction component of the electrostatic force generated decreases, since the electrode 16a and the electrode 23a do not overlap and the electrode 16b and the electrode 23b do not overlap in the plan view as seen in the Z axis direction. In addition, the closer to the substrate 11 the movable plate 21 is, the larger the degree of this decrease becomes. For this reason, the downward biasing force by the electrostatic force acting between the electrode portions 16 and 23 reaches a peak when the movable plate 21 comes to a certain position, and as the movable plate 21 moves closer to the substrate 11 from that position, the downward biasing force by the electrostatic force acting between the electrode portions 16 and 23 decreases. Consequently, the downward biasing force by the electrostatic force acting between the electrode portions 16 and 23 is eventually in equilibrium with the upward spring force by the flexure portions 27a, 27b at a position before the movable plate 21 comes in contact with the bottom of the recessed portion 13 of the substrate 11, and the movable plate 21 stops at that position. If the movable plate 21 is displaced downward from this stop position, the upward spring force becomes the stronger force and the movable plate 21 moves in the reverse direction or the upward direction, while if the movable plate 21 is displaced upward from the stop position, the downward biasing force by the electrostatic force becomes the stronger force, and the movable plate 21 moves in the reverse direction or the downward direction. For this reason, the movable plate 21 is retained stably at the aforementioned stop position. FIG. 5 illustrates this state.

When switching from the state in which the movable plate 21 is retained at the lower position as shown in FIG. 5 to the state shown in FIGS. 3 and 4, it is sufficient to stop generation of the electrostatic force by changing the voltage between the electrode portions 16 and 23 equal to zero. Then, as a result, the movable portion 21 returns to the upper position shown in FIGS. 3 and 4 by the upward spring force by the flexure portions 27a, 27b.

According to this embodiment, as described above, since when an electrostatic force is generated by application of a voltage between the electrode portions 16 and 23, the movable portion 21 is stably retained at a position before it comes in contact with the fixed portion as shown in FIG. 5, the pull-in state, which have occurred in the past, can be prevented from occurring. Since the movable plate 21 does not come in contact with the fixed portion, the possibility that the movable plate 21 sticks to the fixed portion to become inoperable or cause operation delay is eliminated.

Figure 6:
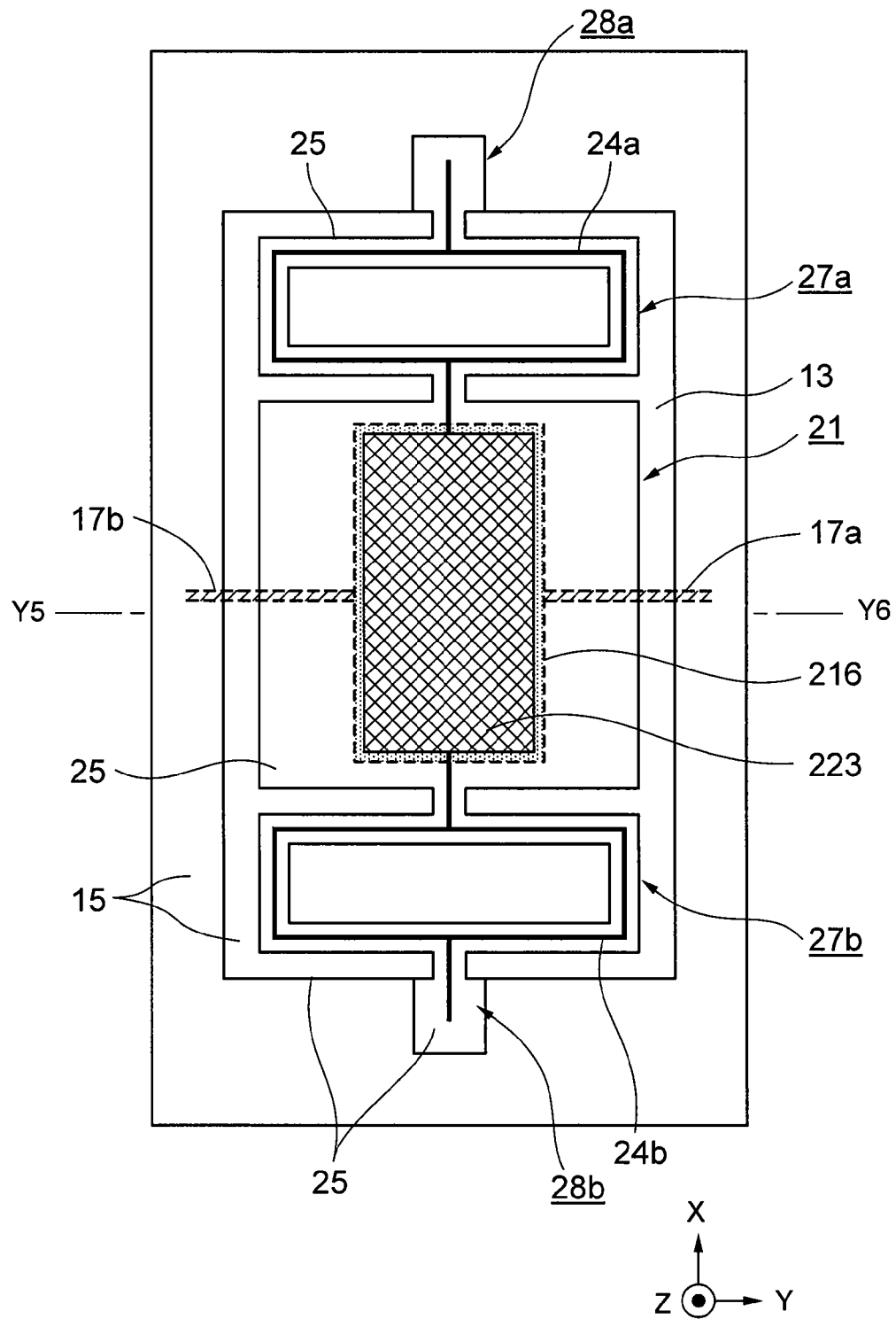
FIG. 6 is a schematic plan view showing an optical switch according to a comparative example.

In the following, a comparative example to be compared with the embodiment will be described with reference to FIGS. 6 to 8. FIG. 6 is a schematic plan view showing an optical switch of the comparative example. FIGS. 7 and 8 are schematic cross sectional views taken along line Y5-Y6 in FIG. 6. FIG. 7 shows a state in which the mirror 12 is retained at an upper position, and the FIG. 8 shows a state in which the mirror 12 is retained at a lower position. FIGS. 6 to 8 are equivalent to FIGS. 2, 3 and 5 respectively. In FIG. 6, however, illustration of the mirror 12 is omitted. In FIGS. 6 to 8, elements the same as or equivalent to elements in FIGS. 2, 3 and 5 are designated by the same reference signs, and redundant descriptions thereof will be omitted.

What is different in the optical switch of this comparative example from the optical switch according to the embodiment is only that in the comparative example, the fixed electrode portion is composed of an electrode 216 that has a quadrilateral shape in the plan view as seen in the Z axis direction, and the movable electrode portion is composed of an electrode 223 that just overlaps the electrode 216 in the plan view as seen in the Z axis direction.

In this comparative example, when a voltage is applied between the electrodes 216 and 223 in the state in which the movable plate 21 is retained at the upper position as shown in FIG. 7, an electrostatic force acts between the two electrodes 216 and 223 in the −Z direction. This causes the movable plate 21 to move in the downward direction (or −Z direction).

As the movable plate 21 is displaced in the downward direction, a spring force of the flexure portions 27a, 27b acts as a restoring force in the upward direction (+Z direction) according to the displacement amount. Since the magnitude of the electrostatic force is larger than the magnitude of this spring force, the movable plate 21 moves downward.

In this comparative example, since the electrodes 216 and 233 just overlap each other in the plan view as seen in the Z axis direction (the situation is the same in cases where most part of them overlap even if there is a non-overlapping part), the electrostatic force in the −Z direction simply increases as the movable plate 21 moves downward and comes closer to the substrate 11, and it does not have a peak. Therefore, the downward force acting on the movable plate 21 by the aforementioned electrostatic force will not be in equilibrium with the upward spring force by the flexure portions 27a, 27b, and the movable plate 21 will not stop until it comes in contact with the bottom of the recessed portion 13 of the substrate 11, as shown in FIG. 8. Once the movable plate 21 comes in contact with the bottom of the recessed portion 13 of the substrate 11 as shown in FIG. 8, it is kept in that state. Thus the pull-in state occurs.

In connection with this, if the voltage between the electrodes 216 and 223 is decreased when the movable plate 21 comes close to the substrate 11, there is a position at which the downward electrostatic force and the upward spring force by the flexure portions 27a, 27b are in equilibrium. However, even if the movable plate 21 once stops at this equilibrium position, the downward electrostatic force becomes stronger than the upward spring force if the movable plate 21 is displaced downward from that position. Therefore, the movable plate 21 cannot be at rest in a stable state at the aforementioned equilibrium position, and when a small positional displacement of the movable plate 21 occurs, downward movement of the movable plate 21 cannot be suppressed only by the upward spring force by the flexure portions 27a, 27b, and the movable plate 21 cannot become stationary until it comes in contact with the bottom of the recessed portion 13 of the substrate 11 after all.

When to switch from the state in which the movable plate 21 is retained at the lower position as shown in FIG. 8 to the state shown in FIG. 7, the voltage between the electrode portions 216 and 223 is changed equal to zero to stop generation of the electrostatic force. Then, as a result, the movable portion 21 should return to the upper position shown in FIGS. 3 and 4 by the upward spring force by the flexure portions 27a, 27b. However, in this comparative example, since the pull-in state as shown in FIG. 8 occurs as described above, the movable plate 21 sticks to the bottom of the recessed portion 13 of the substrate 11 to disable switching to the state shown in FIG. 7 in some cases. Even if such an inoperable state does not occur, detaching the movable plate 21 from the fixed portion takes time and causes operation delay.

By the way, analysis of operation of an actual element requires advanced mathematical techniques such as a finite element method. In the following, to promote understanding of the above described operation principle of the actuator used in this embodiment, a model of the actuator used in this embodiment will be formulated to make the calculation simpler, and the relationship between the position of the movable plate 21 and the force effectively acting on the movable plate 21 will be determined based on that model.

Figure 9:
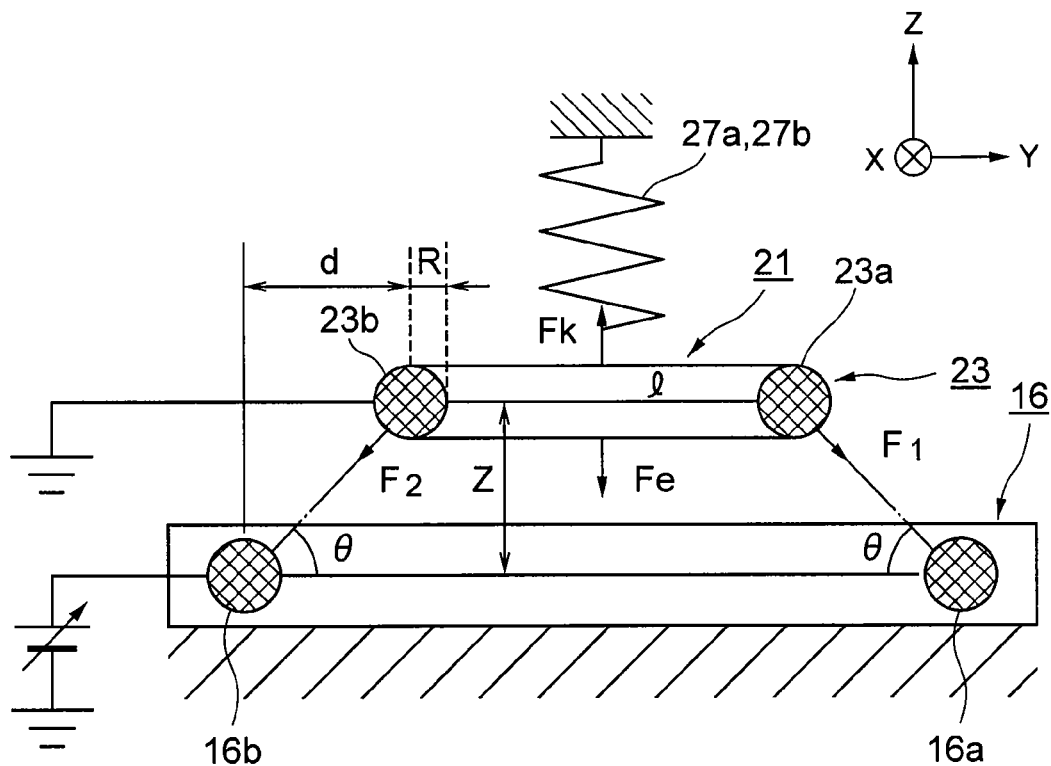
FIG. 9 is a diagram illustrating a model of the actuator used in the first embodiment of the present invention.

FIG. 9 shows a model of the actuator used in this embodiment. The two electrodes 16a, 16b that constitute the fixed electrode portion 16 and the two electrodes 23a, 23b that constitute the movable electrode portion 23 actually have flat plate shapes, but they are assumed to be bar members having a circular cross section (i.e. cylinders) extending in the X axis direction.

It is assumed that all the electrodes 16a, 16b, 23a, 23b have the same shape and dimensions; their length along the X axis direction is represented by L and the radius of the upper surface and the lower surface is represented by R. The distance between the centers of the electrodes 23a and 23b in a plane parallel to the Y-Z plane is represented by l, the distance between the centers of the electrodes 16a and 23a along the Y axis direction and the distance between the centers of the electrodes 16b and 23b along the Y axis direction are both represented by d, the distance between the centers of the electrodes 16a and 23a along the Z axis direction and the distance between the centers of the electrodes 16b and 23b along the Z direction axis are both represented by z, and the angle that the line connecting the centers of the electrodes 16a and 23a forms with the Y axis direction and the angle that the line connecting the centers of the electrodes 16b and 23b forms with the Y axis direction are both represented by θ. The position of the movable plate 21 will be represented by distance z. It is assumed that R<<z, R<<d, z<<L and d<<L hold.

It is assumed that the distance l between the electrodes 23a and 23b is sufficiently long, so that when a voltage V is applied between the fixed electrode 16 and the movable electrode 23, the electrostatic force acts only between the electrodes 16a and 23a and between the electrodes 16b and 23b. The magnitude of the electrostatic force acting between the electrodes 16a, 23a when the voltage V is applied is represented by F1, and the magnitude of the electrostatic force acting between the electrodes 16b, 23b when the voltage V is applied is represented by F2. The electrodes 16a and 16b are kept at an identical electric potential, and the electrodes 23a and 23b are kept at an identical electric potential.

In the model shown in FIG. 9, the spring force by the flexure portions 27a, 27b in the +Z direction is represented by Fk.

In this model, under the assumptions R<<z, R<<d, z<<L and d<<L, the capacitance C0 between the electrodes 23a and 23b is expressed approximately by formula 1 shown below. In formula 1, ε0 is the permittivity of vacuum. In this connection, the permittivity of the Si substrate and the insulator in the movable portion is assumed to be equal to ε0 to facilitate calculation.

$$C_0 \cong \frac{\pi \varepsilon_0}{\ln(\sqrt{d^2+z^2}/R)} \cdot L \quad \text{[Formula 1]}$$

When a voltage V is applied between the electrodes 16a and 23a, an electrostatic force F1 is generated between the electrodes 16a and 23a. The electrostatic force F acting between the two electrodes is expressed by formula 2 shown below in terms of the capacitance C, the voltage V between the electrodes and the distance S between the electrodes. Accordingly the electrostatic force F1 acting between the electrodes 16a and 23a is expressed by formula 3 shown below.

$$F = \frac{1}{2} \cdot \frac{dC}{dS} \cdot V^2 \quad \text{[Formula 2]}$$

$$F_1 \cong \frac{1}{2} \cdot \frac{\pi \varepsilon_0 L}{\{\ln(\sqrt{d^2+z^2}/R)\}^2} \cdot \frac{V^2}{\sqrt{d^2+z^2}} \quad \text{[Formula 3]}$$

Since the direction of the electrostatic force F1 is inclined by the aforementioned angle θ from the Y axis direction, the Y axis component F1y and the Z axis component F1z of the electrostatic force F1 are expressed by formula 4 and formula 5 shown below respectively.

$$F_{1y} = F_1 \cdot \cos\theta \quad \text{[Formula 4]}$$
$$= \frac{1}{2} \cdot \frac{\pi \varepsilon_0 L}{\{\ln(\sqrt{d^2+z^2}/R)\}^2} \cdot \frac{V^2 \cdot d}{d^2+z^2}$$

$$F_{1z} = -F_1 \cdot \sin\theta \quad \text{[Formula 5]}$$
$$= -\frac{1}{2} \cdot \frac{\pi \varepsilon_0 L z}{\{\ln(\sqrt{d^2+z^2}/R)\}^2} \cdot \frac{V^2}{d^2+z^2}$$

The electrostatic force F2 acting between the electrodes 16b and 23b when a voltage V is applied has the same magnitude as the electrostatic force F1, and only the direction is different. Accordingly, the Y axis component F2y and the Z axis component F2z of the electrostatic force F2 are expressed by formula 6 and formula 7 shown below respectively.

$$F_{2y} = -F_{1y} \quad \text{[Formula 6]}$$

$$F_{2z} = F_{1z} \quad \text{[Formula 7]}$$

Therefore, the Y axis component Fey and the Z axis component Fez of the resultant force Fe of the electrostatic force F1 and the electrostatic force F2 are expressed by formula 8 and formula 9 shown below respectively.

$$F_{ey} = F_{1y} + F_{2y} = 0 \quad \text{[Formula 8]}$$

$$F_{ez} = F_{1z} + F_{2z} = -\frac{\pi \varepsilon_0 L z}{\{\ln(\sqrt{d^2+z^2}/R)\}^2} \cdot \frac{V^2}{d^2+z^2} \quad \text{[Formula 9]}$$
$$= F_e$$

In the final analysis, the Y axis component F1y of the electrostatic force F1 and the Y axis component F2y of the electrostatic force F2 cancel each other, and the force Fe that effectively acts on the movable plate 21 by the generated electrostatic forces is the Z axis component Fez of the resultant force of the electrostatic force F1 and the electrostatic force F2.

On the other hand, it is assumed that the flexure portions 27a, 27b obey Hooke's law, and the spring constant thereof is represented by k. It is assumed that the state in which no electrostatic force is acting on the movable plate 21 is equivalent to the state of a coil spring in its natural length, and the position of the movable plate 21 in that state is represented by z0. Then, the spring force Fk by the flexure portions 27a, 27b in the +Z direction is expressed by formula 10 shown below.

$$F_k = k(z_0 - z)$$ [Formula 10]

Figure 10:
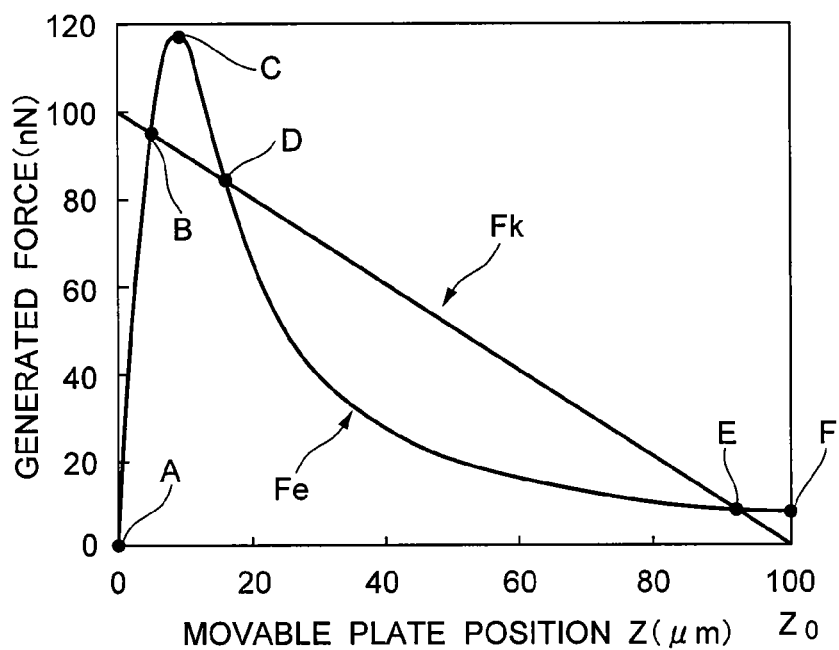
FIG. 10 is a graph showing the relationship between the position of a movable plate and a force Fe by electromagnetic force and a spring force Fk drawn for the model shown in FIG. 9.

FIG. 10 is a graph, drawn according to the above formula 9 and formula 10, showing the relationship between the position z of the movable plate 21 and the electrostatic force Fe and the spring force Fk in the model shown in FIG. 9. In the case shown in FIG. 10, it is assumed that R=1 μm, d=10 μm, L=100 μm, V=75 V, k=1 mN/m and z0=100 μm.

In the following, the aforementioned operation principle of the actuator used in this embodiment will be described using FIG. 10.

As shown in FIG. 10, as the position z of the movable plate 21 changes from z=0 to z=z0, the force Fe in the −Z direction acting on the movable plate 21 by the electrostatic force passes points A to F and has a peak at point C. On the other hand, the spring force Fk in the +Z direction acting on the movable plate 21 is represented by a downward sloping straight line. In the case shown in FIG. 10, the curve representing the force Fe and the line representing the spring force Fk intersect at points B, D and E.

In the case shown in FIG. 10, since Fk>Fe holds in the section of the position z of the movable plate 21 corresponding to the section from point D to point E, even if the force Fe is generated by applying the voltage V=75 V, which was used in drawing the graph shown in FIG. 10, in the state in which the position z of the movable plate 21 is z0, the movable plate 21 cannot be moved below the position of point E only by that. In view of this, in this embodiment, the voltage applied is made larger than that in the above described case so that Fk<Fe holds in all over the section of the position z of the movable plate 21 from point C to point F in FIG. 10 to thereby move the movable plate 21 to a position between point A and point D, and thereafter V=75 V is applied. Then, if the movable plate 21 is at a position between point A and point B, the movable plate 21 moves in the upward direction (or +Z direction) toward point B since the Fk>Fe holds, and when the movable plate 21 comes to point B, both the forces are in equilibrium since Fk=Fe. Thus, the movable plate 21 is at rest at point B. Conversely, if the movable plate 21 is at a position between point B and point D, the movable plate 21 moves in the downward direction (or −Z direction) toward point B since the Fk<Fe holds, and when the movable plate 21 comes to point B, both the forces are in equilibrium since Fk=Fe. Thus, the movable plate 21 is at rest at point B. In the vicinity of point B, since the relation of the forces Fk>Fe that causes the movable plate 21 to move upward holds at positions below point B, and the relation of the forces Fk<Fe that causes the movable plate 21 to move downward holds at positions above point B, the movable plate 21 is stably retained at point B.

In the above description, a case in which a relatively low voltage that realizes values shown in FIG. 10 is applied after a relatively high voltage is applied to move the movable plate 21 from position z0 to the position of point B and retain it at point B has been described by way of example. This is because in retaining the movable plate 21, a lower applied voltage is more preferable in terms of power consumption etc. However, the aforementioned relatively high voltage may be continuously applied without changing it into a relatively low applied voltage even while continuously retaining the movable plate 21. In this case, the stable retaining position of the movable plate 21 corresponding to point B in FIG. 10 is displaced a little from point B in FIG. 10. This will be understood from the fact that when the value of the force Fe at each position is changed in proportion to the square of the applied voltage while leaving the force Fk unchanged, the intersection point is displaced.

In the case where the applied voltage is made higher so that the movable plate 21 is moved to point D, the movable plate 21 remains at point D and does not move toward point B even if the voltage V is changed to V=75 V. To be precise, movement toward point B occurs when the position is below the position of point D.

As described before, when the voltage applied is changed, the stable retaining position of the movable plate 21 corresponding to point B in FIG. 10 is displaced a little from point B in FIG. 10. Therefore, in the actuator used in this embodiment, an analogue-based position control of the movable plate 21 with which the stable retaining position of the movable plate 21 is changed to a desired position according to the magnitude of the voltage applied can be performed. Accordingly, the actuator according to the present invention can be used in various applications in which analogue-based position control of a movable portion is required while still utilizing electrostatic force. Nonetheless, in this embodiment, since the actuator is used in the optical switch as shown in FIGS. 3 and 5 with which digital-based position control is acceptable, it is not necessary to change the applied voltage to perform analogue-based position control of the movable plate 21.

Next, a model of the actuator of the comparative example shown in FIGS. 6 to 8 will be formulated and the relationship between the position of the movable plate 21 and the force effectively acting on the movable plate 21 will be determined in a similar manner as the case of FIG. 9.

Figure 11:
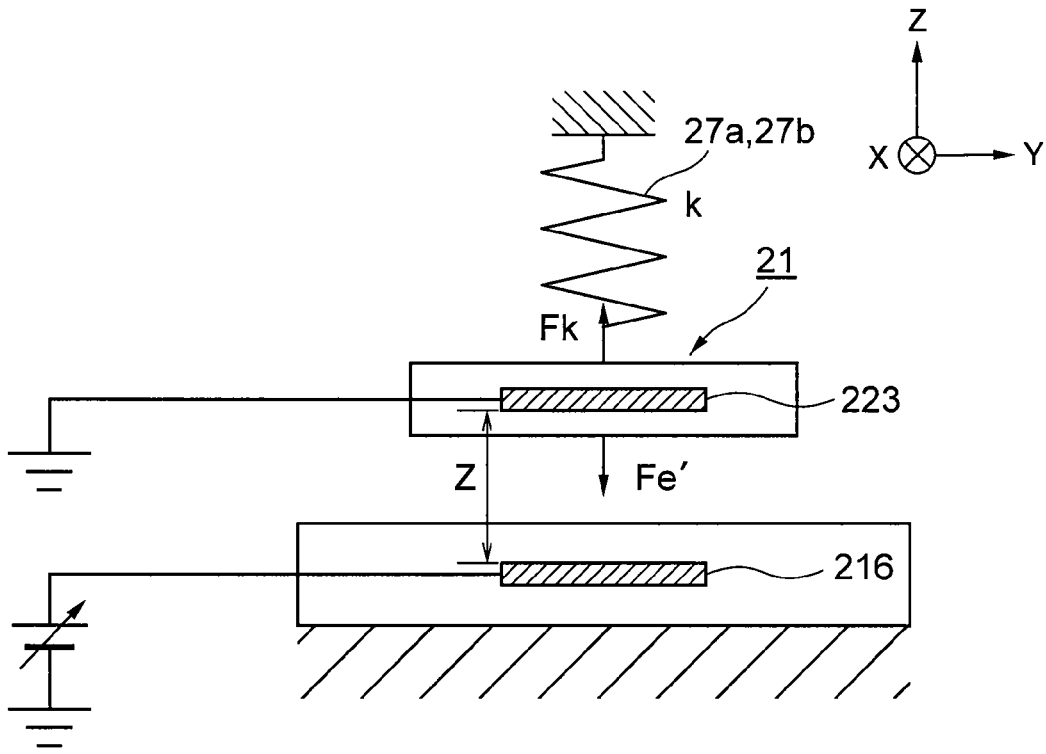
FIG. 11 is a diagram illustrating a model of an actuator according to the comparative example shown in FIGS. 6 to 8.

FIG. 11 shows a model of the actuator of the comparative example shown in FIGS. 6 to 8. In this model also, the spring force Fk in the +Z direction by the flexure portions 27a, 27b is the same as FIG. 9. In the model shown in FIG. 11, the electrode 216 constituting the fixed electrode portion and the electrode 223 constituting the movable electrode portion are constructed as parallel flat plates unlike with the model shown in FIG. 9. In the model shown in FIG. 11, the electrostatic force in the −Z direction acting between the electrodes 216 and 223 when a voltage V is applied is represented by Fe'.

Figure 12:
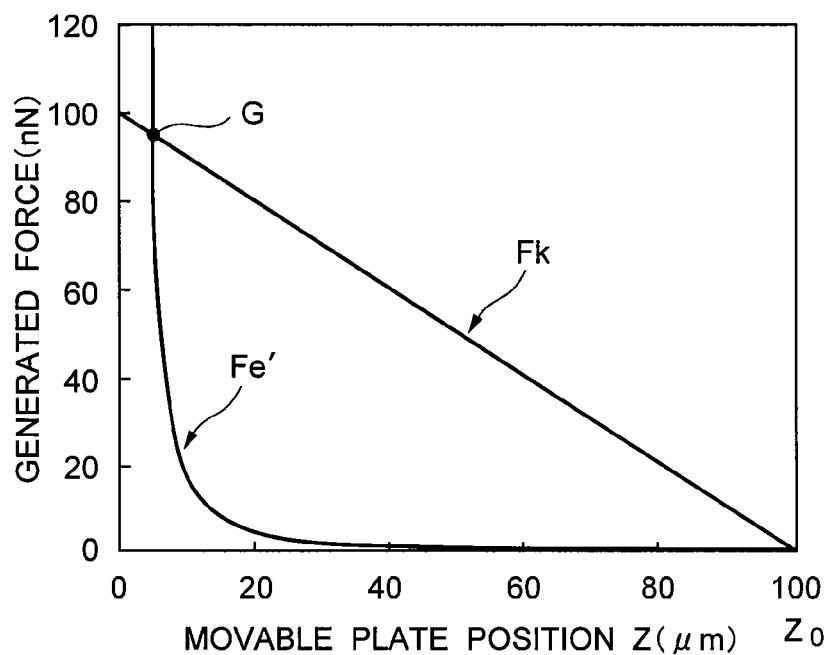
FIG. 12 is a graph showing the relationship between the position of a movable plate and a force Fe' by electromagnetic force and a spring force Fk drawn for the model shown in FIG. 11.

FIG. 12 is a graph, drawn according to a known formula expressing the electrostatic force between parallel flat plates and formula 10 shown before, showing the relationship between the position z of the movable plate 21 (or the distance between the electrodes 216 and 223, in this case) and the electrostatic force Fe' in the −Z direction and the spring force Fk in the model shown in FIG. 11. In the case shown in FIG. 12, it is assumed that the width of the electrodes 216, 223 in the Y axis direction is 10 μm, the length of the electrodes 216, 223 in the x axis direction is 100 μm, and the voltage V applied is 20 V.

As shown in FIG. 12, as the position z of the movable plate 21 changes from z=0 to z=z0, the electrostatic force Fe' in the −Z direction acting on the movable plate 21 does not have a peak unlike with the force Fe in FIG. 10. In addition, the line representing the electrostatic force Fe' and the line representing the spring force Fk intersects at point G. When the movable plate 21 is located below point G, the relationship of forces Fk<Fe' that causes the movable plate 21 to move downward holds, and when the movable plate is located above point G, the relationship of forces Fk>Fe' that causes the movable plate 21 to move upward holds.

A case in which a voltage higher than the voltage applied in the state shown in FIG. 12 is applied in the state in which the position z of the movable plate 21 is z0 to realize the relationship Fk<Fe' to move the movable plate 21 downward will be considered. In this case, if the relatively high voltage is continued to be applied, the relationship Fk<Fe' is maintained even when the movable plate 21 comes to point G or located below point G in FIG. 12, and the movable plate 21 comes in contact with the fixed portion and retained in the contact state to cause the pull-in state. If the voltage applied is changed to the relatively low voltage in the state shown in FIG. 12 when the movable plate 21 comes to point G in FIG. 12, both forces are in equilibrium since Fk=Fe' holds at point G. However, if a small positional displacement of the movable plate 21 in the upward direction from the position of point G occurs, then Fk>Fe' holds, whereby the movable plate 21 is moved upward to return to position z0. On the other hand, if a small positional displacement of the movable plate 21 in the downward direction from the position of point G occurs, then Fk<Fe' holds, whereby the movable plate 21 is moved downward to come in contact with the fixed portion and retained in the contact state to cause the pull-in state.

As above, in this comparative example, trying to retain the movable plate 21 at a lower position results in the pull-in state, and it is impossible to retain the movable plate 21 stably at an intermediate position between the position z0 and the contact position.

In this comparative example, analogue-based control of the movable plate 21 is quite impossible even if the voltage applied is changed, since the pull-in state occurs.

Although in the embodiment, the fixed electrode portion 16 and the movable electrode portion 23 are arranged in such a way that the fixed electrode portion 16 and the movable electrode portion 23 do not overlap at all in the plan view as seen in the Z axis direction as described before, they may be arranged in such a way as to overlap partly to some extent so long as a peak like point C in FIG. 10 is present.

In the embodiment, both the fixed electrode portion 16 and the movable electrode portion 23 have a plane symmetric shape with respect to the plane that contains line X1-X2 and is parallel to the X-Z plane and the plane that contains line Y1-Y2 and is parallel to the YZ plane as described before. However, such symmetry is not essentially required in the present invention. For example, the above mentioned symmetry is not essentially required in the case where the movable portion is guided by guide means and the moving direction of the movable portion is determined regardless of the direction of the force acting on the movable portion accordingly.

Modifications of the First Embodiment

The fixed electrode portion 16 and the movable electrode portion 23 in the above described first embodiment may be modified in the manners illustrated in FIGS. 13 to 16 respectively.

FIGS. 13 to 16 are schematic plan views equivalent to FIG. 2 that show modifications of the above described first embodiment respectively. In FIGS. 13 to 16, elements the same as or equivalent to the elements in FIG. 2 are designated by the same reference signs, and redundant descriptions thereof will be omitted. In FIGS. 13 to 16, illustration of the mirror 12 is omitted.

In every embodiment, both the fixed electrode portion 16 and the movable electrode portion 23 have a plane symmetric shape with respect to the plane that contains line X1-X2 and is parallel to the X-Z plane and the plane that contains line Y1-Y2 and is parallel to the YZ plane.

Figure 13:
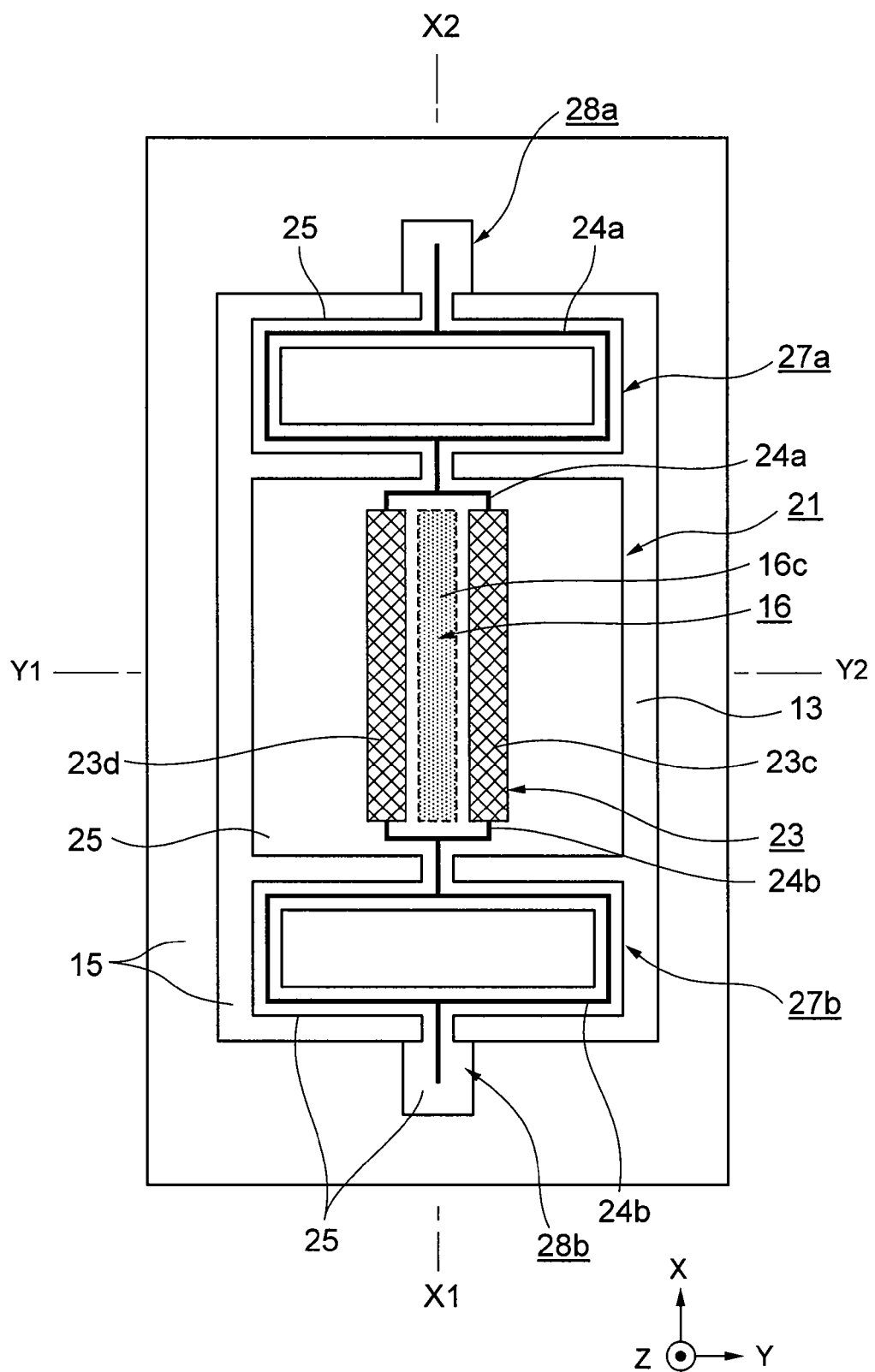
FIG. 13 is a schematic plan view showing a modification of the first embodiment.

In the modification shown in FIG. 13, the fixed electrode portion 16 is composed of one rectangular strip-like electrode 16*c* extending in the X axis direction. The movable electrode 23 is composed of two rectangular strip-like electrodes 23*c*, 23*d* extending in the X axis direction. The electrode 16*c* is arranged in such a way as to extend along line X1-X2 in the plan view as seen in the Z axis direction. In the plan view as seen in the Z axis direction, the electrodes 23*c* and 23*d* are arranged on the +Y side and the −Y side of the electrode 16*c* respectively side by side with a small spacing from the electrode 16*c*, and they do not overlap the electrode 16*c*. Although the wiring pattern for the electrode 16*c* is not illustrated in FIG. 13, the wiring pattern overlaps the electrode 23*c* (or 23*d*) in the plan view as seen in the Z axis direction. However, the overlapping area is small, and there is no problem in producing a peak like point C in FIG. 10.

Figure 14:
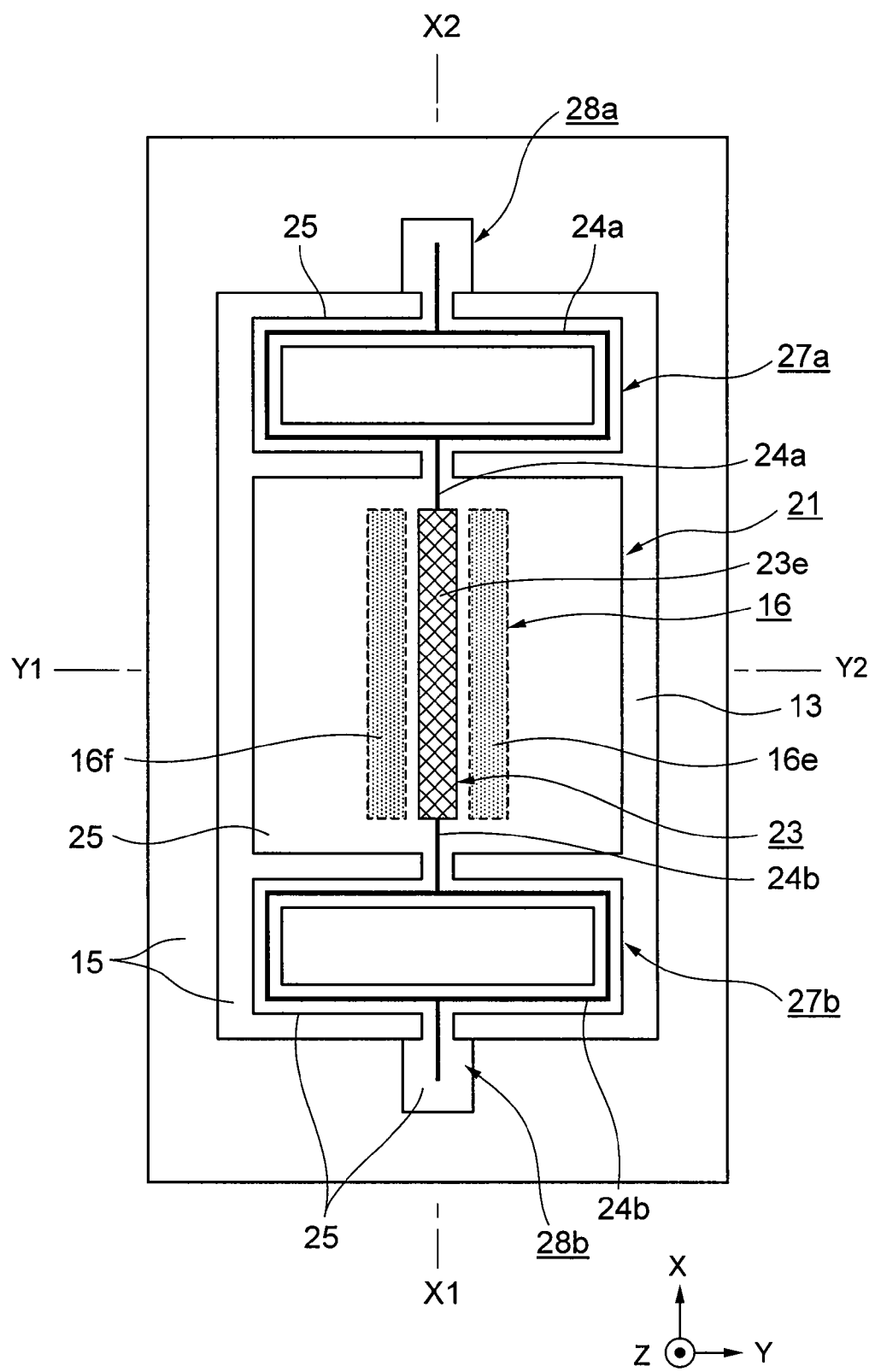
FIG. 14 is a schematic plan view showing another modification of the first embodiment.

In the modification shown in FIG. 14, the fixed electrode portion 16 is composed of two rectangular strip-like electrodes 16*e*, 16*f* extending in the X axis direction. The movable electrode portion 23 is composed of one rectangular strip-like electrode 23*e* extending in the X axis direction. The electrode 23*e* is arranged in such a way as to extend along line X1-X2 in the plan view as seen in the Z axis direction. In the plan view as seen in the Z axis direction, the electrodes 16*e* and 16*f* are arranged on the +Y side and the −Y side of the electrode 23*e* respectively side by side with a small spacing from the electrode 23*e*, and they do not overlap the electrode 23*e*. Although the wiring patterns for the electrodes 16*e* and 16*f* is not illustrated in FIG. 14, the wiring pattern does not overlap the electrode 23*e* in the plan view as seen in the Z axis direction.

Figure 15:
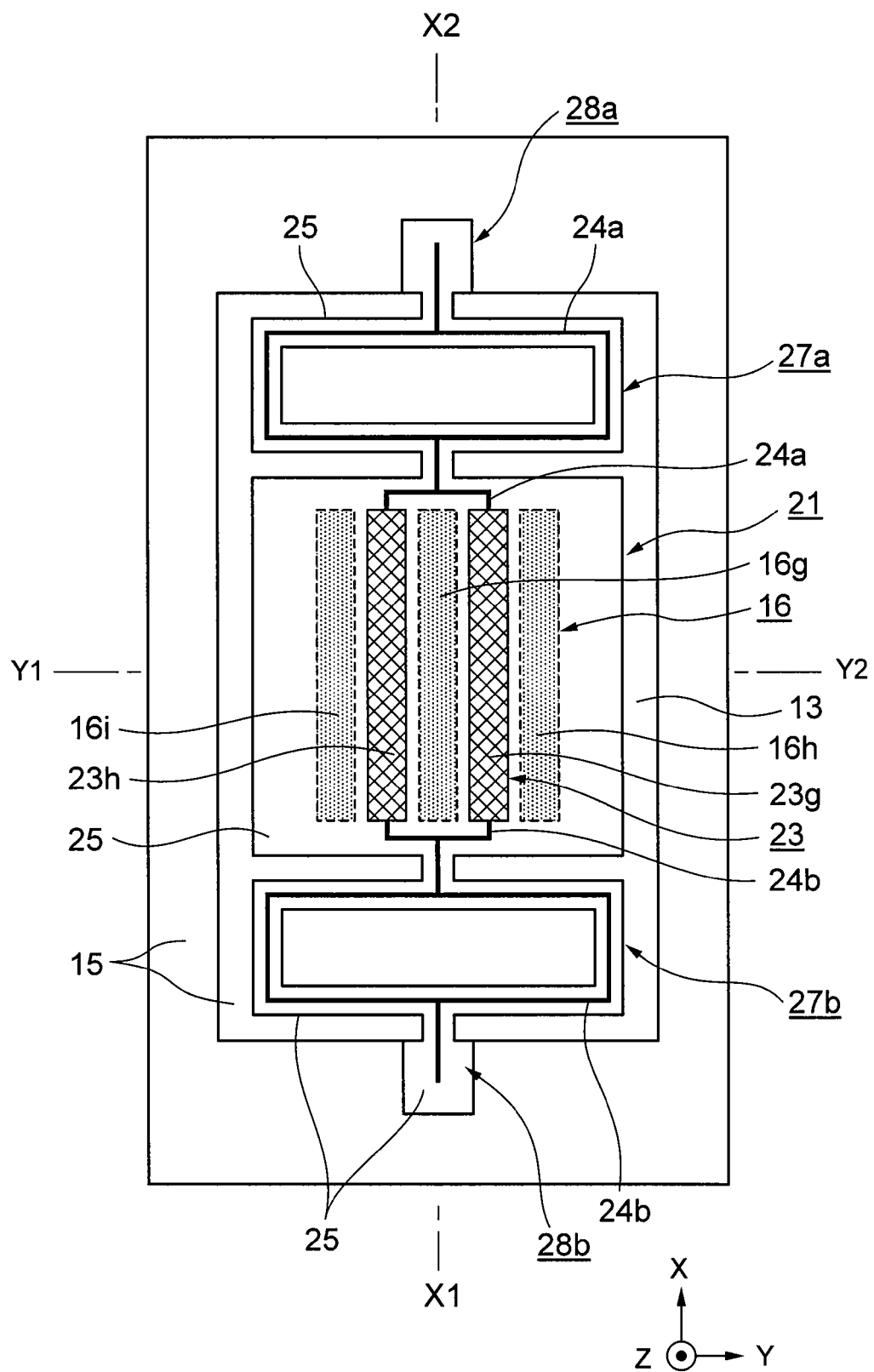
FIG. 15 is a schematic plan view showing still another modification of the first embodiment.

In the modification shown in FIG. 15, the fixed electrode portion 16 is composed of three rectangular strip-like electrodes 16*g*, 16*h*, 16*i* extending in the X axis direction. The movable electrode portion 23 is composed of two rectangular strip-like electrode 23*g*, 23*h* extending in the X axis direction. The electrode 16*g* is arranged in such a way as to extend along line X1-X2 in the plan view as seen in the Z axis direction. In the plan view as seen in the Z axis direction, the electrodes 23*g* and 23*h* are arranged on the +Y side and the −Y side of the electrode 16*g* respectively side by side with a small spacing from the electrode 16*g*, and they do not overlap the electrode 16*g*. In the plan view as seen in the Z axis direction, the electrode 16*h* is arranged on the +Y side of the electrode 23*g* side by side with a small spacing from the electrode 23*g*, and it does not overlap the electrode 23*g*. In the plan view as seen in the Z axis direction, the electrode 16*i* is arranged on the −Y side of the electrode 23*h* side by side with a small spacing from the electrode 23*h*, and it does not overlap the electrode 23*h*. Although the wiring patterns for the electrodes 16*g*, 16*h* and 16*i* are not illustrated in FIG. 15, the wiring pattern for the electrode 16*g* overlaps the electrode 23*g* (or 23*h*) in the plan view as seen in the Z axis direction. However, the overlapping area is small, and there is no problem in producing a peak like point C in FIG. 10.

Figure 16:
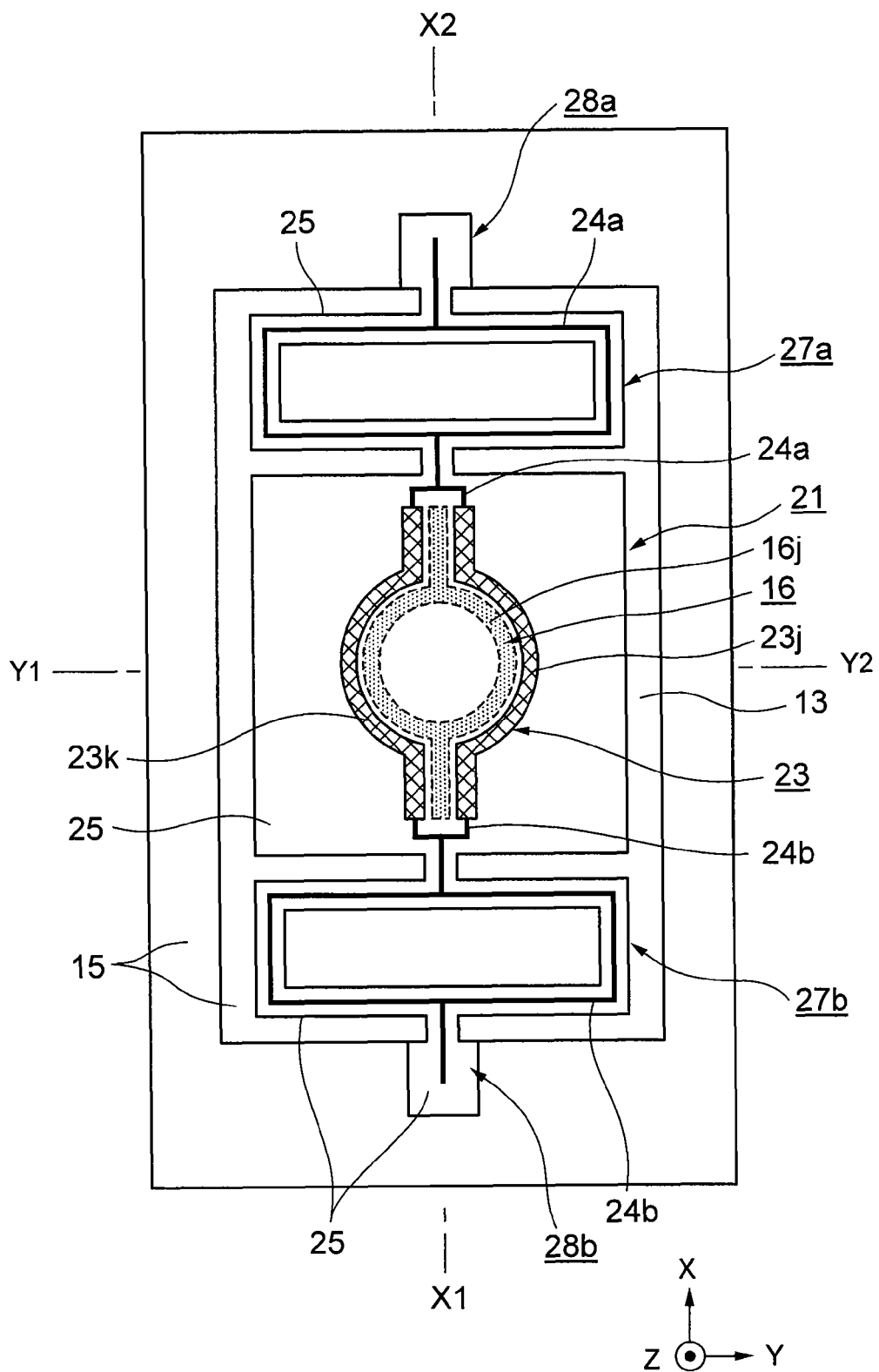
FIG. 16 is a schematic plan view showing still another modification of the first embodiment.

In the modification shown in FIG. 16, the fixed electrode portion 16 is composed of an electrode 16*j* having an annular portion and rectangular strip-like portions extending from its +X side and −X side of the X axis direction in the +X direction and −X direction respectively. The movable electrode portion 23 is composed of two band-like electrodes 23*j*, 23*k* extending on the +X side and −X side of the electrode 16*j* respectively with a small spacing from the electrode 16*j* while conforming to the shape of the electrode 16*j* in the plan view as seen in the Z axis direction. The electrodes 23*j* and 23*k* do not overlap the electrode 16*j*. Although the wiring pattern for the electrode 16*j* is not illustrated in FIG. 16, the wiring pattern overlaps the electrode 23*j* (or 23*k*) in the plan view as seen in the Z axis direction. However, the overlapping area is small, and there is no problem in producing a peak like point C in FIG. 10.

Second Embodiment

Figure 17:
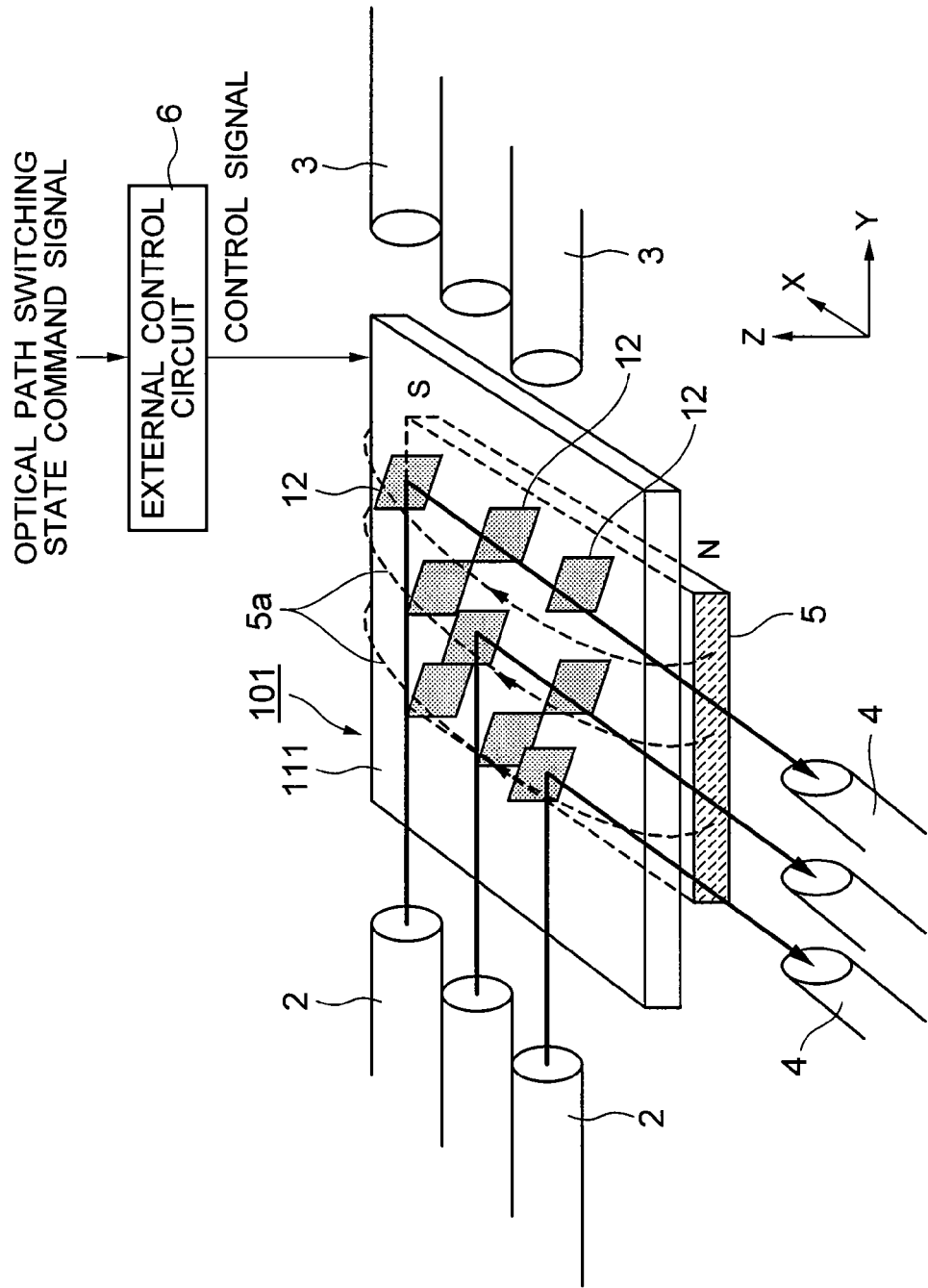
FIG. 17 is a general diagram schematically showing an example of an optical system provided with an optical switch array according to a second embodiment of the present invention.

FIG. 17 is a general diagram schematically showing an example of an optical system (that is, in this embodiment, an optical switch system) provided with an optical switch array 101 that constitutes an optical switch apparatus as an optical apparatus according to the second embodiment of the present invention. In FIG. 17, elements the same as or equivalent to elements in FIG. 1 are designated by the same reference signs, and redundant descriptions thereof will be omitted.

What is different in the optical system shown in FIG. 17 from the optical system shown in FIG. 1 is only that an optical switch array 101 is used in place of the optical switch array 1, the external control circuit 6 operates in a different way accordingly, and a magnet 5 serving as a magnetic field generation portion that generates a magnetic field for the optical switch array 101 is additionally provided as will be described later.

In this embodiment, the magnet 5 is disposed beneath the optical switch array 101 as shown in FIG. 17 and generates a magnetic field illustrated by magnetic lines of force 5a for the optical switch array 101. Specifically, the magnet 5 generates a substantially uniform magnetic field directed along the X axis direction toward the plus side thereof for the optical switch array 101.

Figure 18:
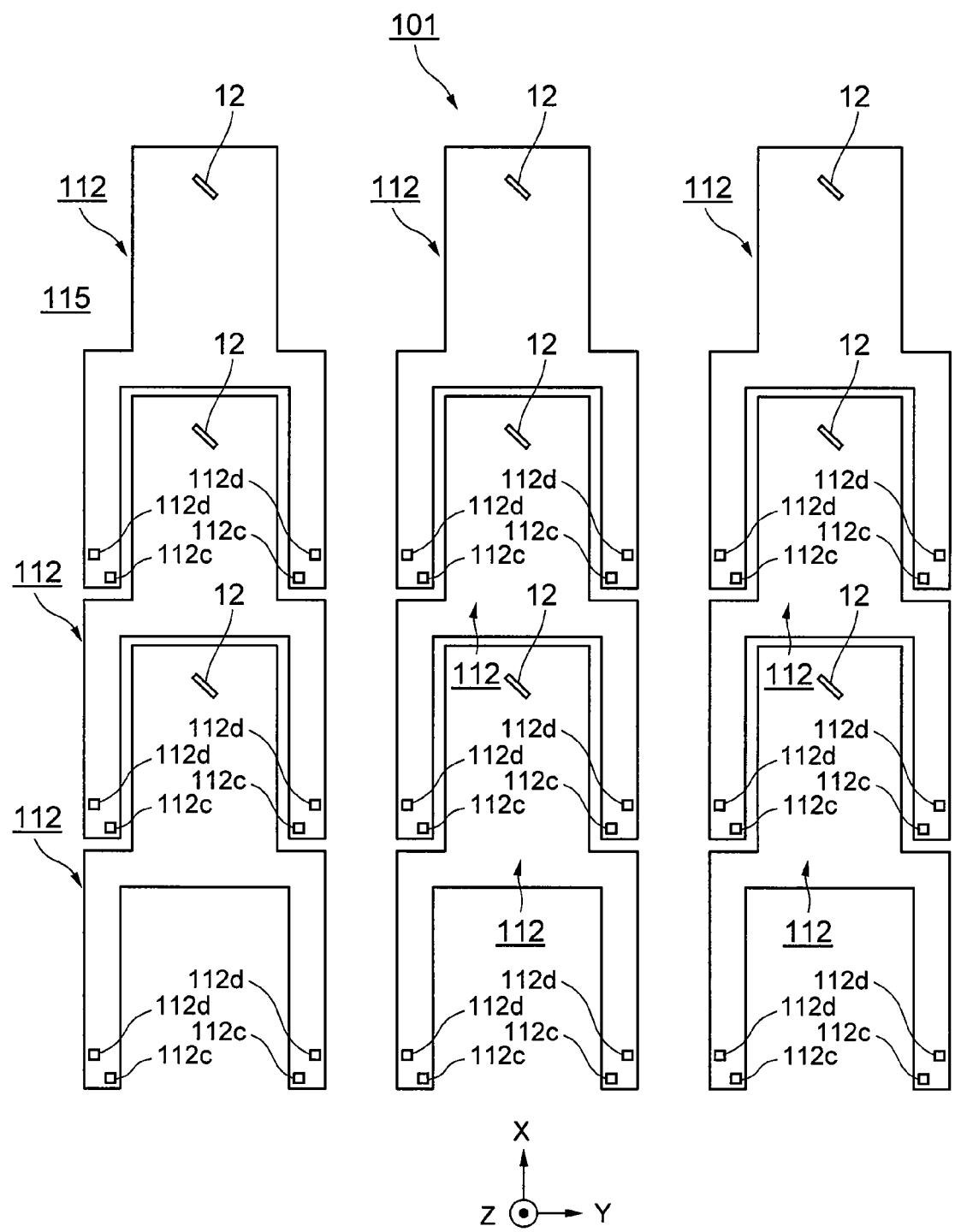
FIG. 18 is a schematic plan view schematically showing an optical switch array in FIG. 17.

FIG. 18 is a general plan view schematically showing the optical switch array 101 in FIG. 17. The optical switch array 101 is provided with a substrate 111 (not shown in FIG. 18), m×n movable plates 112 arranged two dimensionally on the substrate 111 and, mirrors 12 provided on the respective movable plates 112. The portion of the optical switch array 101 other than the mirrors 12 constitutes a microactuator array as a microactuator apparatus.

Next, the structure of one optical switch as a unit element of the optical switch array 101 shown in FIG. 17 will be described with reference to FIGS. 19 to 25.

Figure 19:
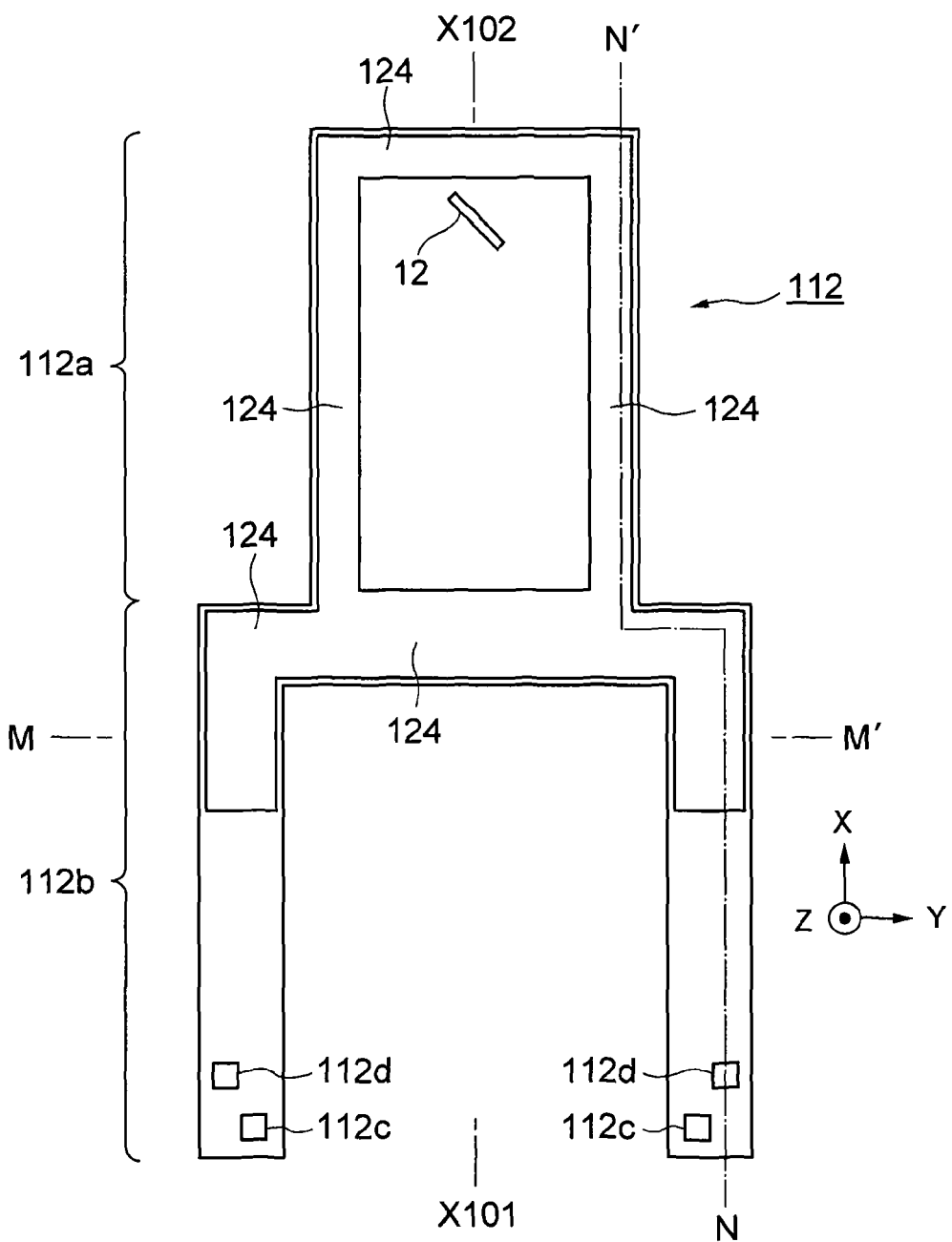
FIG. 19 is a schematic plan view schematically showing one optical switch as a unit element of the optical switch array shown in FIG. 17.
Figure 20:
FIG. 20 is a schematic cross sectional view taken along line M-M' in FIG. 19.
Figure 21:
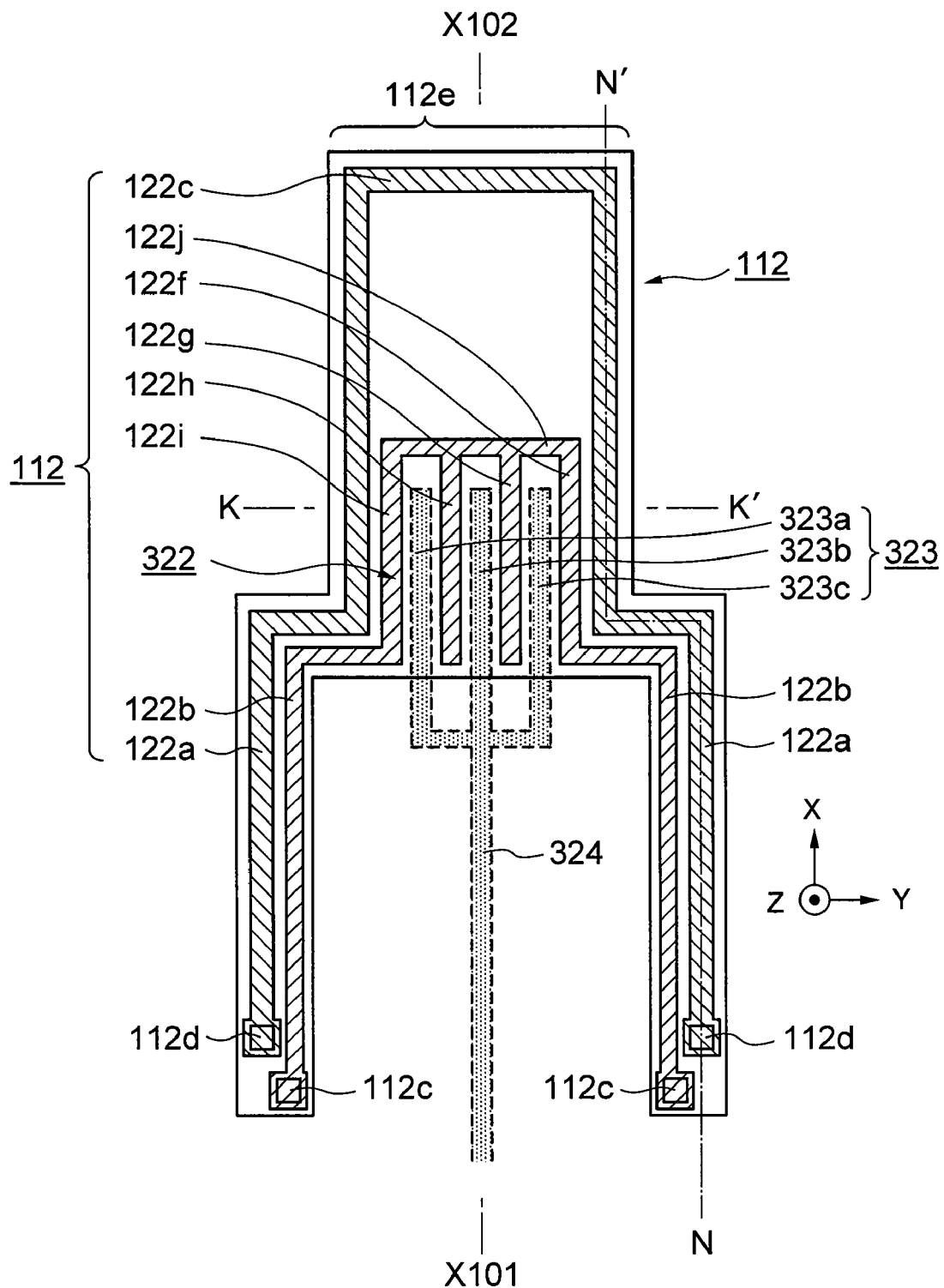
FIG. 21 is a diagram showing a patterned shape of an Al film where the movable plate in FIG. 19 is seen from above.
Figure 22:
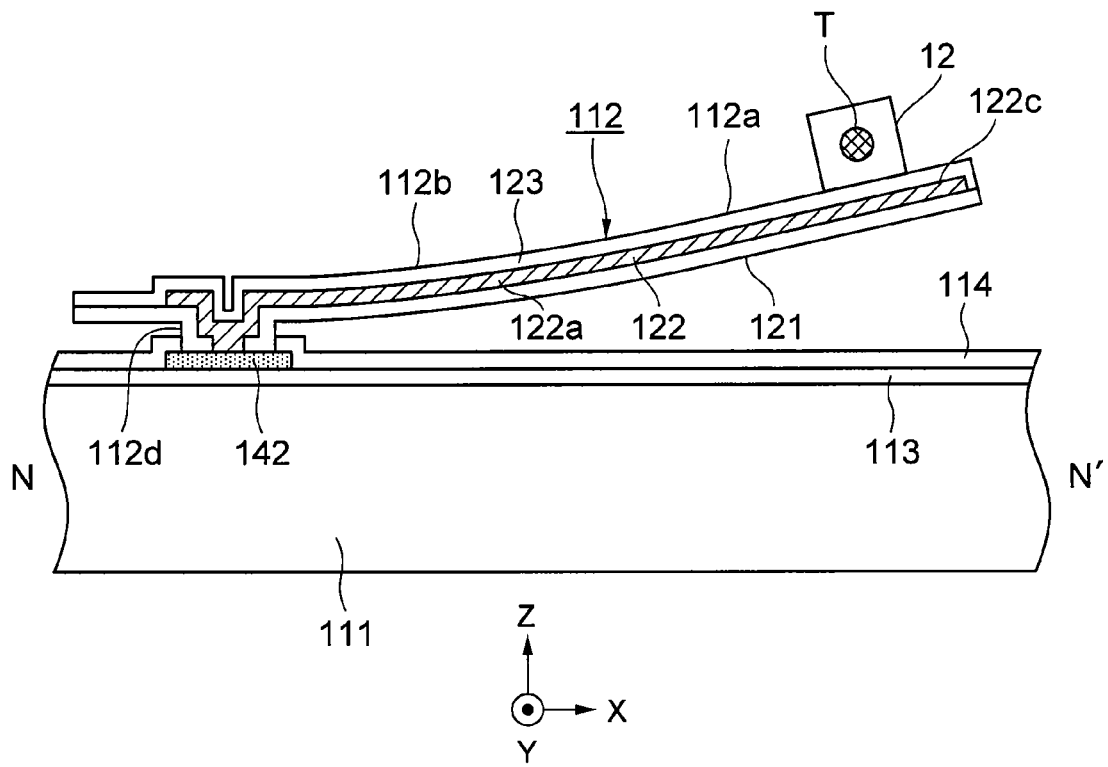
FIG. 22 is a schematic cross sectional view showing a cross section along line N-N' in FIGS. 19 and 21 as seen from the +Y direction in the −Y direction, FIG. 22 showing a state in which a mirror is retained at an upper position.
Figure 23:
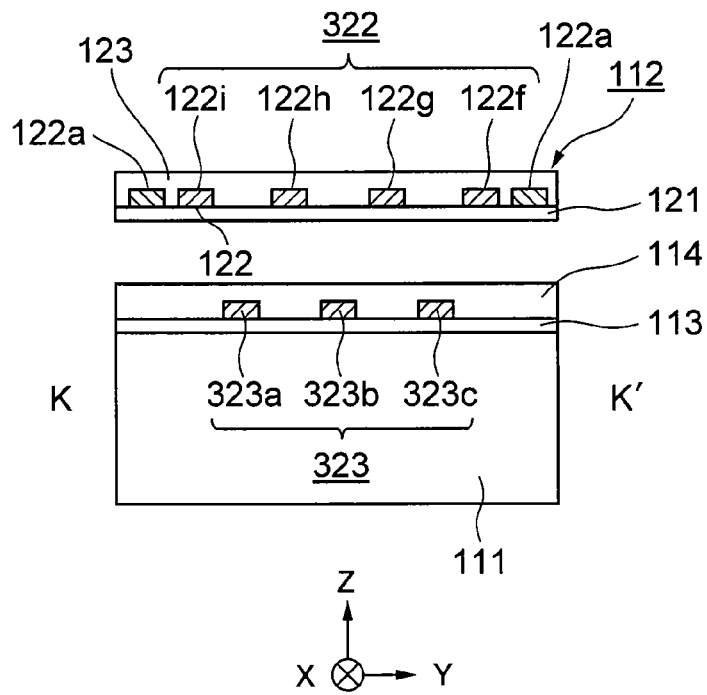
FIG. 23 is a schematic cross sectional view showing a cross section along line K-K' in FIG. 21, FIG. 23 showing a state in which the mirror is retained at the upper position.
Figure 24:
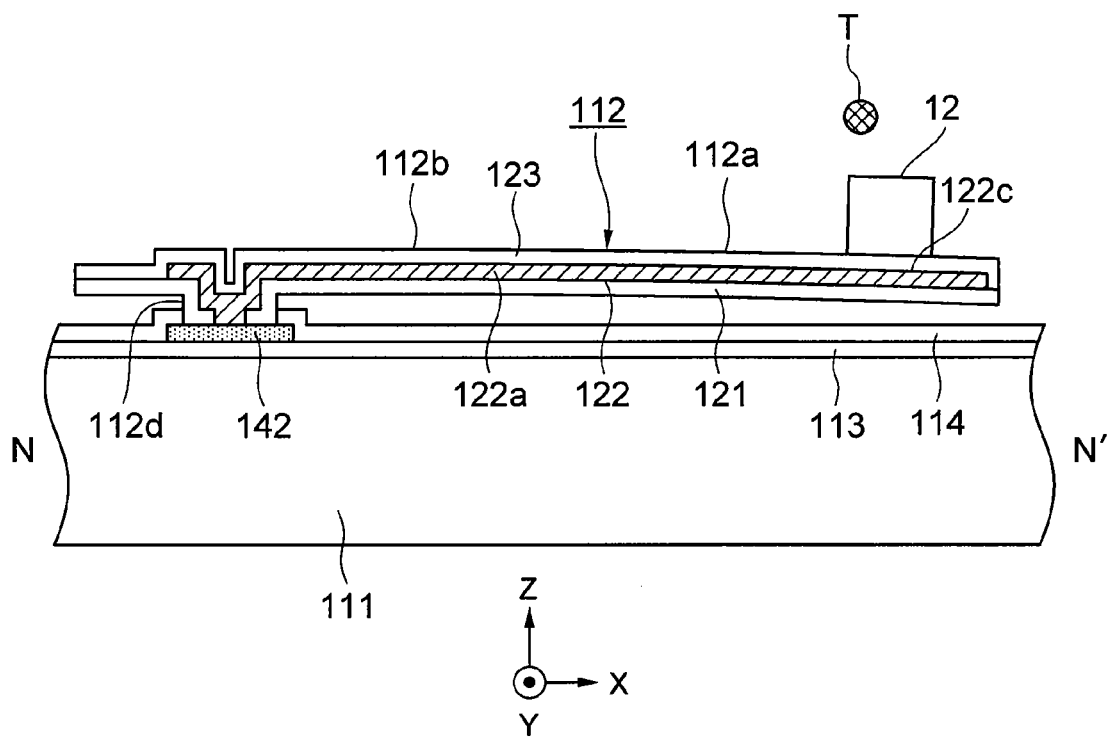
FIG. 24 is a schematic cross sectional view showing a cross section along line N-N' in FIGS. 19 and 21 as seen from the +Y direction in the −Y direction, FIG. 24 showing a state in which the mirror is retained at a lower position.
Figure 25:
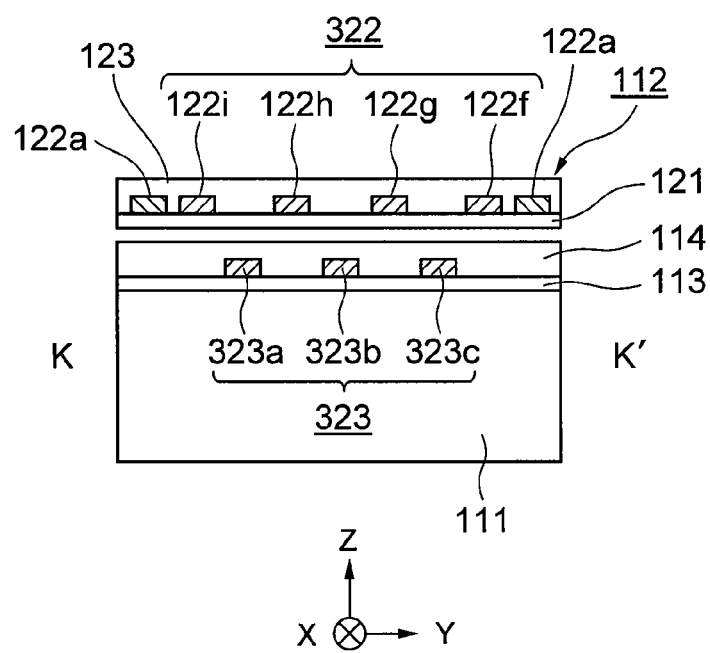
FIG. 25 is a schematic cross sectional view showing a cross section along line K-K' in FIG. 21, FIG. 25 showing a state in which the mirror is retained at the lower position.

FIG. 19 is a general plan view schematically illustrating one optical switch as a unit element of the optical switch array 101 shown in FIG. 17. FIG. 20 is a schematic cross sectional view taken along line M-M' in FIG. 19. Please note that FIG. 20 shows the cross section of only the movable plate 112. FIG. 21 illustrates the shape of the pattern of an Al film 122 when the movable plate 112 in FIG. 19 is seen from above. To facilitate understanding, the area of the Al film 122 is hatched in FIG. 21. In FIG. 21, a fixed electrode portion 323 and a wiring pattern 324 for it are additionally illustrated. FIGS. 22 and 24 are schematic cross sectional views taken along line N-N' in FIGS. 19 and 21 respectively as seen from the +Y side in the −Y direction. Please note that FIGS. 22 and 24 additionally show the mirror 12 as seen in the −Y direction. FIGS. 23 and 25 are schematic cross sectional views taken along line K-K' in FIG. 21. FIGS. 22 and 23 show a state in which the mirror 12 is retained at a upper position at which it is present in an optical path, and FIGS. 24 and 25 show a state in which the mirror 12 is retained at a lower position at which the mirror 12 is away from the optical path. In FIGS. 22 and 25, for the convenience of graphical illustration, illustration of a protruding portion 124 that will be described later is omitted, as if there were not a difference in height associated with the protruding portion 124.

The optical switch as the unit element of optical switch array 101 has one movable plate 112 serving as a movable portion that is provided on the substrate 111 such as a silicon substrate and constitutes one microactuator together with the substrate 111 and the mirror 12 as an optical element serving as a driven member mounted on the movable plate 112.

The movable plate 112 is plane symmetric in shape and structure with respect to the plane that contains line X101-X102 and is parallel to the X-Z plane as shown in FIGS. 19 and 21.

The movable plate 112 is made of thin films and includes a lower silicon nitride film (SiN film) 121 extending all over the planar shape of the movable plate 112, an upper SiN film 123 and an intermediate Al film 122 partly provided between these films 121 and 123 as shown in FIGS. 19 to 25. Thus, the movable plate 112 includes a portion composed of a two layered film in which the SiN films 121 and 123 are layered in order from the bottom and a portion composed of a three layered film in which the SiN film 121, Al film 122 and SiN film 123 are layered in order from the bottom. The pattern shape of the Al film 122 as shown in FIG. 21 will be described later. The movable plate 112 is formed according to predetermined film thickness and film forming conditions so that it is bent upward (in the +Z direction) relative to the substrate 111 as shown in FIG. 22 by internal stress caused by a difference in the thermal expansion coefficient between the SiN films 121, 123 and the Al film 122 and internal stress caused upon film formation.

The movable plate 112 includes a mirror mount plate 112a having a rectangular shape as a mount portion on which the mirror 12 is mounted (i.e. a supporting base for the mirror 12) and two band-like support plates 112b connected to an end of the mirror mount plate 112a as shown in FIG. 19. In this embodiment, the two support plates 112b are two beam portions that are mechanically connected to each other in parallel. Each of the support plates 112b has leg portions 112c and 112d at the end thereof. Both the leg portions 112c and 112d are fixed on the substrate 111. In the movable plate 112, the leg portions 112c and 112d provide a fixed end, and the mirror mount plate 112a side can be raised as shown in FIG. 22. As above, in this embodiment, the movable plate 112 is a movable portion having a cantilever structure with the fixed end at the leg portions 112c and 112d. In this embodiment, the substrate 111, insulating films 113, 114 and the fixed electrode portion 323 etc. layered thereon that will be described later constitute the fixed portion.

As shown in FIG. 19, the movable plate 112 has the protruding portion 124 that is provided thereon in such a way as to surround the portion of the movable plate 112 on which the mirror 12 is mounted. The protruding portion 124 is produced by shaping the multi-layered film constituting the movable plate 112 to form a protrusion. Since providing the protruding portion 124 in this way creates a difference in height, bending by the internal stress is suppressed in the region of the movable plate 112 surrounded by the protruding portion 124 and the region of the movable plate 112 in which the protruding portion 124 is provided and flatness can be maintained in these regions. For this reason, in the movable plate 112, the portion on which the mirror 12 is mounted is planar even in the state in which the mirror 12 is raised to an upper position by bending caused by the internal stress as shown in FIG. 22, and accordingly the shape of the mirror 12 mounted thereon can be kept unchanged.

As above, in the movable plate 112, bending is suppressed in the region surrounded by the protruding portion 124 and the region in which the protruding portion 124 is provided, but the protruding portion 124 is not provided in the region near the leg portions 112d of the support plate 112b. Accordingly, in the movable plate 112, the mirror mount plate 112a side thereof can be raised by bending of the region of the support plate 112b in which the protruding portion is not provided with the leg portions 112c, 112d serving as the fixed end, as shown in FIG. 22. In addition, the region of the support plate 112b near the leg portions 112d constitutes a plate spring portion as an elastic portion because the protruding portion 124 is not provided in that region.

In the following, the shape of the Al film 122 in the movable plate 112 will be described with reference to FIG. 21. In this embodiment, since the movable plate 112 is driven using both Lorentz force and electrostatic force as driving forces, the Al film 122 is patterned in the shape shown in FIG. 21. A pattern 122a in the Al film 122 extends from each of the two leg portions 112d to the end side (or the +X side) of the movable plate 112 along the outer peripheral edge of the movable plate 112 and are connected to a linear pattern 122c extending in the Y axis direction along the side 112e at the end of the movable plate 112. The pattern 122c constitutes a current path (or current path for Lorentz force) that is disposed in a magnetic field to generate a Lorentz force as a driving force when electric current is supplied thereto. Hereinafter, the pattern 122c will be referred to as the Lorentz force current path 122c in some cases. The pattern 122c is also a pattern included in the Al film 122. The patterns 122a are wiring patterns for supplying a current to the Lorentz force current path 122c. As shown in FIGS. 22 and 24, the pattern 122a is connected to a wiring pattern for Lorentz force 142 made of an Al film via contact holes in the insulating film 114 and the SiN film 121 at the +Y side leg portion 112d, and connected to another wiring pattern for Lorentz force 142 at the −Y side leg portion in the same manner. A current serving as a drive signal for Lorentz force is supplied from the wiring pattern for Lorentz force 142 to the pattern 122a via the leg portions 112d. The Lorentz force current path 122c is in a magnetic field directed in the X axis direction generated by the magnet 5 shown in FIG. 17. Therefore, when a current is supplied to the Lorentz force current path 122c via the pattern 122a, a Lorentz force in the +Z direction or −Z direction acts on the Lorentz force current path 122c according to the direction of the current.

As shown in FIGS. 22 to 24, on the substrate 111 are layered insulating films 113 and 114 such as silicon oxide films in order from the substrate 111 side, and the wiring pattern for Lorentz force 142 is formed between the insulating films 113 and 114.

A pattern 122b in the Al film 122 extends from each of the two leg portions 112c to the vicinity of the base side (or the −X side) of the mirror mount plate 112a of the movable plate 112 along the inner edges of the two band-like support plates 112b of the movable plate 112 and is connected to a movable electrode portion 322 provided near the base of the mirror mount plate 112a to constitute a wiring pattern for the movable electrode portion 322. An electrostatic force can be created between the movable electrode portion 322 and a fixed electrode portion 323 that will be described later by a voltage between the movable electrode portion 322 and the fixed electrode portion 323.

As shown in FIGS. 21, 23 and 25, the movable electrode portion 322 is composed of four rectangular strip-like electrodes 122f, 122g, 122h, 122i extending in the X axis direction in the plan view as seen in the Z axis direction. The +X side ends of the electrodes 122f, 122g, 122h and 122i are connected one another by a wiring pattern 122j. The two wiring patterns 122b are connected to the −X side end of the electrode 122f and the −X side end of the electrode 122i respectively. The electrodes 122f, 122g, 122h, 122i and the wiring pattern 122j are also patterns included in the Al film 122.

With the arrangement of the electrodes 122f, 122g, 122h, 122i that constitute the movable electrode portion 322 as shown in FIG. 21, the movable electrode portion 322 has a plane symmetric shape with respect to the plane that contains line X101-X102 and is parallel to the X-Z plane.

The pattern 122b is connected to a wiring pattern for the movable electrode (not shown) via contact holes in the insulating film 114 and the SiN film 121 at the leg portions 112c, and a voltage (a voltage for electrostatic force, or a drive signal for electrostatic force) is applied between it and the fixed electrode portion 323.

The fixed electrode portion 323 is composed of three rectangular strip-like electrodes 323a, 323b, 323c extending in the X axis direction as shown in FIGS. 21, 23 and 25 and is provided between the insulating films 113 and 114 on the substrate 111 with a wiring pattern 324 for the fixed electrode portion 323. The fixed electrode portion 323 and the wiring pattern 324 are made of continuously formed integral Al film. With the arrangement of the electrodes 323a, 323b, 323c that constitute the fixed electrode portion 323 as shown in FIG. 21, the fixed electrode portion 323 has a plane symmetric shape with respect to the plane that contains line X101-X102 and is parallel to the X-Z plane.

In this embodiment, the electrode 323b is arranged in such a way as to extend along line X101-X102 in the plan view as seen in the Z axis direction. In the plan view as seen in the Z axis direction, the electrodes 122g and 122h are arranged on the +Y side and the −Y side of the electrode 323b respectively side by side with a small spacing from the electrode 323b, and they do not overlap the electrode 323b. In the plan view as seen in the Z axis direction, the electrode 323a is arranged on the −Y side of the electrode 122h side by side with a small spacing from the electrode 122h, and the electrode 323a does not overlap the electrode 122h. In the plan view as seen in the Z axis direction, the electrode 323c is arranged on the +Y side of the electrode 122g side by side with a small spacing from the electrode 122g, and the electrode 323c does not overlap the electrode 122g. In the plan view as seen in the Z axis direction, the electrode 122f is arranged on the +Y side of the electrode 323c side by side with a small spacing from the electrode 323c, and the electrode 122f does not overlap the electrode 323c. In the plan view as seen in the Z axis direction, the electrode 122i is arranged on the −Y side of the electrode 323a side by side with a small spacing from the electrode 323a, and the electrode 122i does not overlap the electrode 323a.

In this embodiment, by arranging the electrodes that constitute the fixed electrode portion 323 and the movable electrode portion 322 in the above described manner, a first force that biases the movable plate 112 downwardly (in the −Z direction) according to the electrostatic force acting between the electrode portions 323 and 322 when the voltage between the electrode portions 323 and 322 is constant is designed to have a peak when the movable plate 112 is at a third position between the lower bound position (or the first position) at which the movable plate 112 is in contact with the insulating film 114 of the substrate 111 and the upper position (or the second position) shown in FIGS. 22 and 23.

In this embodiment, by controlling the voltage between the fixed electrode portion 323 and the movable electrode portion 322 and the current supplied to the Lorentz force current path 122c, the state in which the mirror 12 is retained at the upper position (away from the substrate 111) (FIGS. 22 and 23) and the state in which the mirror 12 is retained at the lower position (close to the substrate 11) (FIGS. 24 and 25) can be achieved as will be described in detail later. In this embodiment, this control is performed by the external control circuit 6 shown in FIG. 17. In FIGS. 22 and 24, T denotes the cross section of the optical path of the incident light in relation to the positions at which the mirror 12 has been brought.

A microactuator that drives the mirror 12 is constituted by the components of the above described optical switch structure other than the mirror 12.

The optical switch array 101 according to this embodiment can be manufactured using semiconductor manufacturing techniques such as forming and patterning of a film, etching, and forming and removal of a sacrificial layer, for example. The mirror 12 can be manufactured by, for example, the method same as that in the above described first embodiment.

According to this embodiment, since the fixed electrode portion 323 and the movable electrode portion 322 are configured in the above described way, the relationship between the position of the movable plate 112 and the force effectively acting on the movable plate 112 by the electrostatic force acting between the electrode portions 323 and 322 when a constant voltage is applied between the electrode portions 323 and 322 is similar to the relationship shown in FIG. 10 described above.

According to this embodiment, in the state in which the aforementioned electrostatic force and the aforementioned Lorentz force do not act, the state in which the support plate 112b is bent in the +Z direction by the stress (or spring force) of the plate spring portion constituted by the region of the support plate 112b that is close to the leg portions 112d (i.e. the region in which the protruding portion 124 is not provided) is restored, and the mirror 12 is retained at the upper position, as shown in FIGS. 22 and 23. Thus, the mirror 12 is brought into the optical path T to reflect light incident on the optical path.

When this state is to be switched to the state in which light incident on the optical path T is allowed to pass without change without being reflected by the mirror 12, for example, the above mentioned Lorentz force is first applied to move the movable plate 112 downward against the spring force of the above mentioned plate spring portion of the support plate 112b, whereby the movable plate 112 is moved by the above mentioned Lorentz force to an arbitrary position corresponding to the range from point A to point D in FIG. 10. In this state, application of the above mentioned Lorentz force is terminated, and the voltage associated with FIG. 10 is applied between the fixed electrode portion 323 and the movable electrode portion 322. As a result, the movable electrode portion 322 is stably retained at the position corresponding to point B in FIG. 10 (that is, a position before the movable plate 112 comes in contact with the insulating film 114 on the substrate 111) in a similar manner as the above described first embodiment. FIGS. 24 and 25 illustrate this state.

In the state in which the mirror 12 is retained at the lower position, the incident light passes though without change without being reflected by the mirror 12 to become exit light, since the mirror 12 stays out from the optical path T.

When to switch from the state in which the movable plate 112 is retained at the lower position as shown in FIGS. 24 and 25 to the state shown in FIGS. 22 and 23, it is sufficient to stop generation of the electrostatic force by, for example, changing the voltage between the electrode portions 323 and 322 equal to zero. Then, as a result, the movable plate 112 returns to the upper position shown in FIGS. 22 and 23 by the upward spring force by the above mentioned plate spring portion of the support plate 112b.

According to this embodiment, as described above, since when an electrostatic force is generated by application of a voltage between the electrode portions 323 and 322, the movable portion 112 is stably retained at a position before it comes in contact with the fixed portion as shown in FIGS. 24 and 25, the pull-in state, which have occurred in the past, can be prevented from occurring. Since the movable plate 112 does not come in contact with the fixed portion, the possibility that the movable plate 112 sticks to the fixed portion to become inoperable or cause operation delay is eliminated.

The time at which the Lorentz force applied is once disabled and a voltage is applied to the electrode portions 323 and 322 in switching from the state shown in FIGS. 22 and 23 to the state shown in FIGS. 24 and 25 may be either before the movable plate 112 is brought into contact with the fixed portion or after it is once brought into contact with the fixed portion by the Lorentz force. Even if the movable plate 112 is brought into contact with the fixed portion by the Lorentz force, the Lorentz force can be made smaller than the electrostatic force in the state shown in FIG. 8 in the comparative example by far, and therefore the possibility that the movable plate 112 sticks to the fixed portion to become inoperable is almost eliminated.

In the actuator used in this embodiment also, an analogue-based position control of the movable plate 112 with which the stable retaining position of the movable plate 112 is changed to a desired position according to the magnitude of the voltage applied can be performed, as with the actuator used in the above described first embodiment.

Although embodiments and modifications of the present invention have been described, the present invention is not limited to these embodiments and modifications.

For example, in the above described second embodiment, patters similar to the patterns of the fixed electrode portion 16 and the movable electrode portion 23 in the above described first embodiment or any one of the modifications shown in FIGS. 13 to 16 may be used as the patterns of the fixed electrode portion 323 and the movable electrode portion 322.

According to the present invention, the above described second embodiment may be configured in such a way that a different force (such as a force utilizing a change in the stress of a thin film caused by thermal expansion or a force utilizing a piezoelectric effect) may be used in place of the Lorentz force as a force used besides the electrostatic force.

Furthermore, although a spring force is used as the force for returning the movable plate to the upper position in the above described first and second embodiments, a configuration in which a different force (e.g. a magnetic force) can be utilized in place of the spring force may be adopted in the present invention.

The microactuator according to the present invention can be used in optical apparatuses other than optical switches and other various applications.

The invention claimed is:

1. A microactuator comprising a fixed portion and a movable portion that is provided in such a way as to be movable relative to said fixed portion between a first position at which it is in contact with a predetermined portion of said fixed portion and a second position away from said first position, characterized in that:
   said fixed portion has a first electrode portion;
   said movable portion has a second electrode portion that can produce an electrostatic force between it and said first electrode portion by a voltage between it and said first electrode portion; and
   said first and second electrode portions are arranged in such a way that a constant voltage applied therebetween generates a first force according to said electrostatic force, that biases said movable portion in a direction toward said first position and reaches a peak when said movable portion is at a third position between said first position and said second position.

2. A microactuator according to claim 1 characterized in that said first and second electrode portions are arranged in such a way that said first and second electrode portions substantially do not overlap each other when seen in the direction of movement of said movable portion between said first and second positions.

3. A microactuator comprising a fixed portion and a movable portion that is provided in such a way as to be movable relative to said fixed portion between a first position at which it is in contact with a predetermined portion of said fixed portion and a second position away from said first position, characterized in that:
   said fixed portion has a first electrode portion;
   said movable portion has a second electrode portion that can produce an electrostatic force between it and said first electrode portion by a voltage between it and said first electrode portion;
   a direction of movement of the movable portion is perpendicular to a plane of the second electrode portion; and
   said first and second electrode portions are arranged in such a way that said first and second electrode portions substantially do not overlap each other when seen in the direction of movement of said movable portion between said first and second positions.

4. A microactuator according to claim 1 characterized in that each of said first and second electrode portions has a substantially plane symmetric shape with respect to at least one same plane containing the direction of movement of said movable portion between said first and second positions.

5. A microactuator according to claim 1 characterized in that the microactuator is designed in such a way that a second force that biases said movable portion in a direction from said first position toward said second position can be generated.

6. A microactuator according to claim 5 characterized in that said movable portion is provided in such a way that a spring force that tends to return to said second position is generated as said second force.

7. A microactuator according to claim 5 characterized in that the microactuator is provided with generation means that generates a third force different from said first and second forces in said movable portion.

8. A microactuator according to claim 6 characterized in that the microactuator is provided with generation means that generates a third force different from said first and second forces in said movable portion.

9. A microactuator according to claim 8 characterized in that said generation means comprises a current path that is provided in said movable portion and disposed in a magnetic field and generates a Lorentz force when supplied with a current.

10. A microactuator according to claim 7 characterized in that said generation means comprises a current path that is provided in said movable portion and disposed in a magnetic field and generates a Lorentz force when supplied with a current.

11. A microactuator according to claim 2 characterized in that each of said first and second electrode portions has a substantially plane symmetric shape with respect to at least one same plane containing the direction of movement of said movable portion between said first and second positions.

12. A microactuator according to claim 2 characterized in that the microactuator is designed in such a way that a second force that biases said movable portion in a direction from said first position toward said second position can be generated.

13. A microactuator according to claim 12 characterized in that said movable portion is provided in such a way that a spring force that tends to return to said second position is generated as said second force.

14. A microactuator according to claim 12 characterized in that the microactuator is provided with generation means that generates a third force different from said first and second forces in said movable portion.

15. A microactuator according to claim 13 characterized in that the microactuator is provided with generation means that generates a third force different from said first and second forces in said movable portion.

16. A microactuator according to claim 15 characterized in that said generation means comprises a current path that is provided in said movable portion and disposed in a magnetic field and generates a Lorentz force when supplied with a current.

17. A microactuator according to claim 14 characterized in that said generation means comprises a current path that is provided in said movable portion and disposed in a magnetic field and generates a Lorentz force when supplied with a current.

18. A microactuator according to claim 3 characterized in that each of said first and second electrode portions has a substantially plane symmetric shape with respect to at least one same plane containing the direction of movement of said movable portion between said first and second positions.

19. A microactuator according to claim 3 characterized in that the microactuator is designed in such a way that a second force that biases said movable portion in a direction from said first position toward said second position can be generated.

20. A microactuator according to claim 19 characterized in that said movable portion is provided in such a way that a spring force that tends to return to said second position is regenerated as said second force.

21. A microactuator comprising a fixed portion and a movable portion that is provided in such a way as to be movable relative to said fixed portion between a first position at which it is in contact with a predetermined portion of said fixed portion and a second position away from said first position, characterized in that:
   said fixed portion has a first electrode portion;
   said movable portion has a second electrode portion that can produce an electrostatic force between it and said first electrode portion by a voltage between it and said first electrode portion;
   said first and second electrode portions are arranged in such a way that said first and second electrode portions substantially do not overlap each other when seen in the direction of movement of said movable portion between said first and second positions;
   the microactuator is designed in such a way that a second force that biases said movable portion in a direction from said first position toward said second position can be generated; and
   the microactuator is provided with generation means that generates a third force different from said first and second forces in said movable portion.

22. A microactuator comprising a fixed portion and a movable portion that is provided in such a way as to be movable relative to said fixed portion between a first position at which it is in contact with a predetermined portion of said fixed portion and a second position away from said first position, characterized in that:
   said fixed portion has a first electrode portion;

said movable portion has a second electrode portion that can produce an electrostatic force between it and said first electrode portion by a voltage between it and said first electrode portion;

said first and second electrode portions are arranged in such a way that said first and second electrode portions substantially do not overlap each other when seen in the direction of movement of said movable portion between said first and second positions;

the microactuator is designed in such a way that a second force that biases said movable portion in a direction from said first position toward said second position can be generated;

said movable portion is provided in such a way that a spring force that tends to return to said second position is generated as said second force; and the microactuator is provided with generation means that generates a third force different from said first and second forces in said movable portion.

23. A microactuator comprising a fixed portion and a movable portion that is provided in such a way as to be movable relative to said fixed portion between a first position at which it is in contact with a predetermined portion of said fixed portion and a second position away from said first position, characterized in that:

said fixed portion has a first electrode portion;

said movable portion has a second electrode portion that can produce an electrostatic force between it and said first electrode portion by a voltage between it and said first electrode portion;

said first and second electrode portions are arranged in such a way that said first and second electrode portions substantially do not overlap each other when seen in the direction of movement of said movable portion between said first and second positions;

the microactuator is designed in such a way that a second force that biases said movable portion in a direction from said first position toward said second position can be generated;

said movable portion is provided in such a way that a spring force that tends to return to said second position is generated as said second force;

the microactuator is provided with generation means that generates a third force different from said first and second forces in said movable portion; and said generation means comprises a current path that is provided in said movable portion and disposed in a magnetic field and generates a Lorentz force when supplied with a current.

24. A microactuator comprising a fixed portion and a movable portion that is provided in such a way as to be movable relative to said fixed portion between a first position at which it is in contact with a predetermined portion of said fixed portion and a second position away from said first position, characterized in that:

said fixed portion has a first electrode portion;

said movable portion has a second electrode portion that can produce an electrostatic force between it and said first electrode portion by a voltage between it and said first electrode portion;

said first and second electrode portions are arranged in such a way that said first and second electrode portions substantially do not overlap each other when seen in the direction of movement of said movable portion between said first and second positions;

the microactuator is designed in such a way that a second force that biases said movable portion in a direction from said first position toward said second position can be generated;

the microactuator is provided with generation means that generates a third force different from said first and second forces in said movable portion; and said generation means comprises a current path that is provided in said movable portion and disposed in a magnetic field and generates a Lorentz force when supplied with a current.

25. An optical apparatus comprising a microactuator and a driven member, wherein said microactuator includes a fixed portion and a movable portion that is provided in such a way as to be movable relative to said fixed portion between a first position at which it is in contact with a predetermined portion of said fixed portion and a second position away from said first position, said fixed portion has a first electrode portion, said movable portion has a second electrode portion that can produce an electrostatic force between it and said first electrode portion by a voltage between it and said first electrode portion, said first and second electrode portions are arranged in such a way that a constant voltage applied therebetween generates a first force according to said electrostatic force, that biases said movable portion in a direction toward said first position and reaches a peak when said movable portion is at a third position between said first position and said second position, and wherein said driven member is mounted on said movable portion of said microactuator and includes an optical element.

26. An optical apparatus according to claim 25 characterized in that said first and second electrode portions are arranged in such a way that said first and second electrode portions substantially do not overlap each other when seen in the direction of movement of said movable portion between said first and second positions.

27. An optical switch comprising a microactuator and a driven member, wherein said microactuator includes a fixed portion and a movable portion that is provided in such a way as to be movable relative to said fixed portion between a first position at which it is in contact with a predetermined portion of said fixed portion and a second position away from said first position, said fixed portion has a first electrode portion, said movable portion has a second electrode portion that can produce an electrostatic force between it and said first electrode portion by a voltage between it and said first electrode portion, and said first and second electrode portions are arranged in such a way that a constant voltage applied therebetween generates a first force according to said electrostatic force, that biases said movable portion in a direction toward said first position and reaches a peak when said movable portion is at a third position between said first position and said second position, and wherein said driven member is mounted on said movable portion of said microactuator and includes a mirror.

28. An optical switch according to claim 27 characterized in that said first and second electrode portions are arranged in such a way that said first and second electrode portions substantially do not overlap each other when seen in the direction of movement of said movable portion between said first and second positions.

29. An optical apparatus comprising a microactuator and a driven member,
wherein said microactuator includes a fixed portion and a movable portion that is provided in such a way as to be movable relative to said fixed portion between a first position at which it is in contact with a predetermined portion of said fixed portion and a second position away from said first position,
said fixed portion has a first electrode portion,
said movable portion has a second electrode portion that can produce an electrostatic force between it and said first electrode portion by a voltage between it and said first electrode portion, and
said first and second electrode portions are arranged in such a way that said first and second electrode portions substantially do not overlap each other when seen in a direction of movement of said movable portion between said first and second positions,
the direction of movement of the movable portion is perpendicular to a plane of the second electrode portion, and
wherein said driven member is mounted on said movable portion of said microactuator and includes an optical element.

30. An optical switch comprising a microactuator and a driven member,
wherein said microactuator includes a fixed portion and a movable portion that is provided in such a way as to be movable relative to said fixed portion between a first position at which it is in contact with a predetermined portion of said fixed portion and a second position away from said first position,
said fixed portion has a first electrode portion,
said movable portion has a second electrode portion that can produce an electrostatic force between it and said first electrode portion by a voltage between it and said first electrode portion, and
said first and second electrode portions are arranged in such a way that said first and second electrode portions substantially do not overlap each other when seen in a direction of movement of said movable portion between said first and second positions,
the direction of movement of the movable portion is perpendicular to a plane of the second electrode portion, and
wherein said driven member is mounted on said movable portion of said microactuator and includes a mirror.

* * * * *